Figure 1:
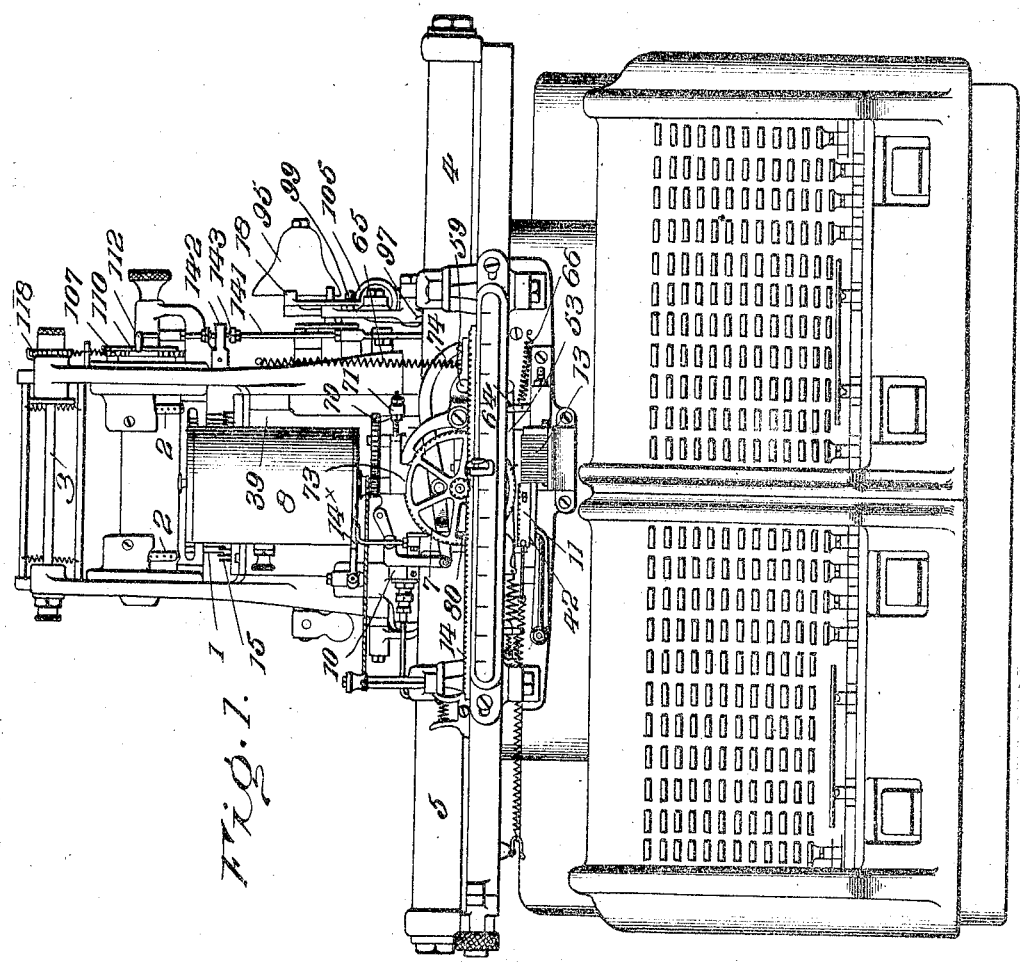

J. S. BANCROFT & M. C. INDAHL.
RECORD STRIP COMPOSING MACHINE.
APPLICATION FILED JUNE 5, 1908.

944,405.

Patented Dec. 28, 1909.
13 SHEETS—SHEET 1.

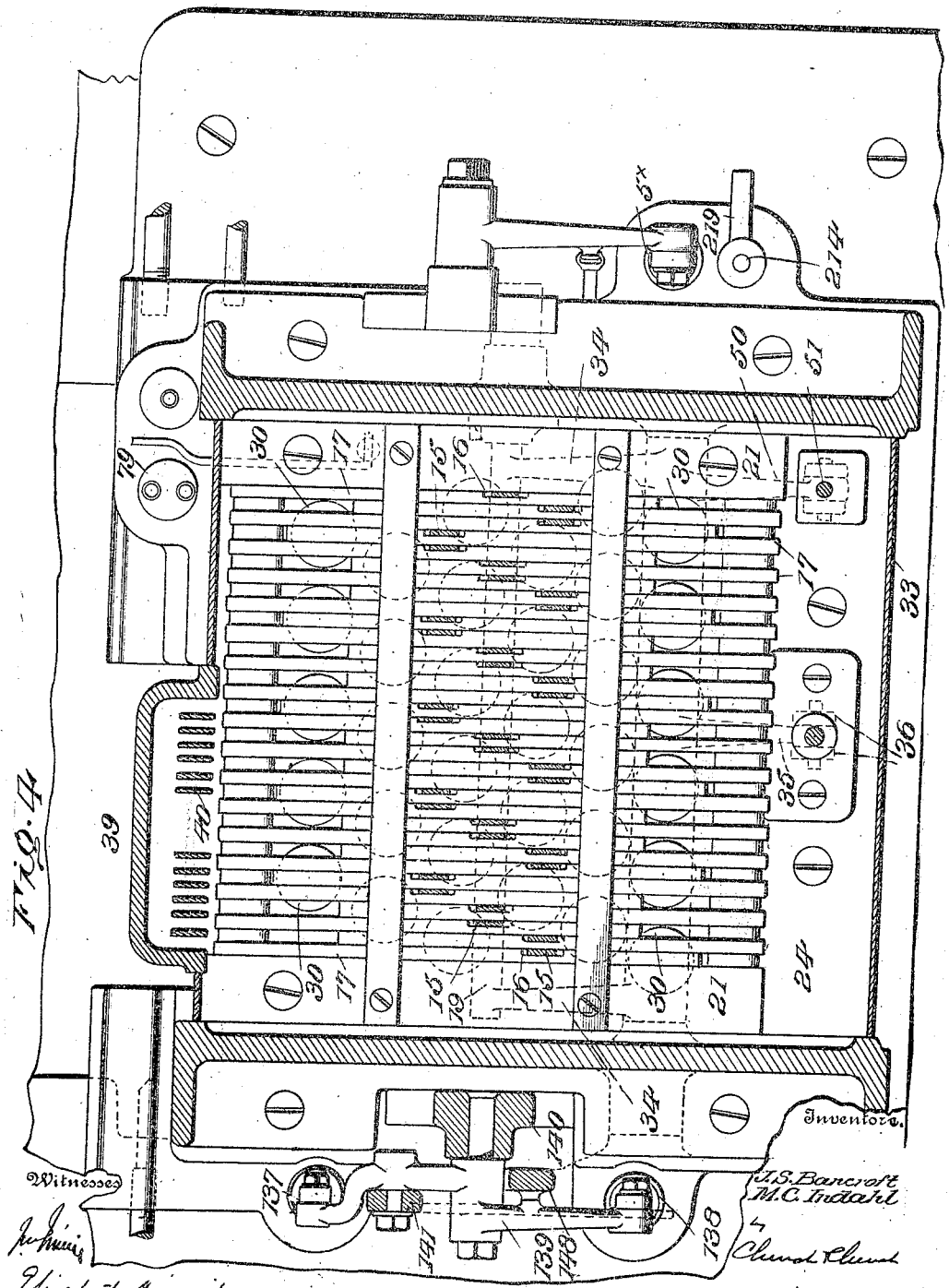

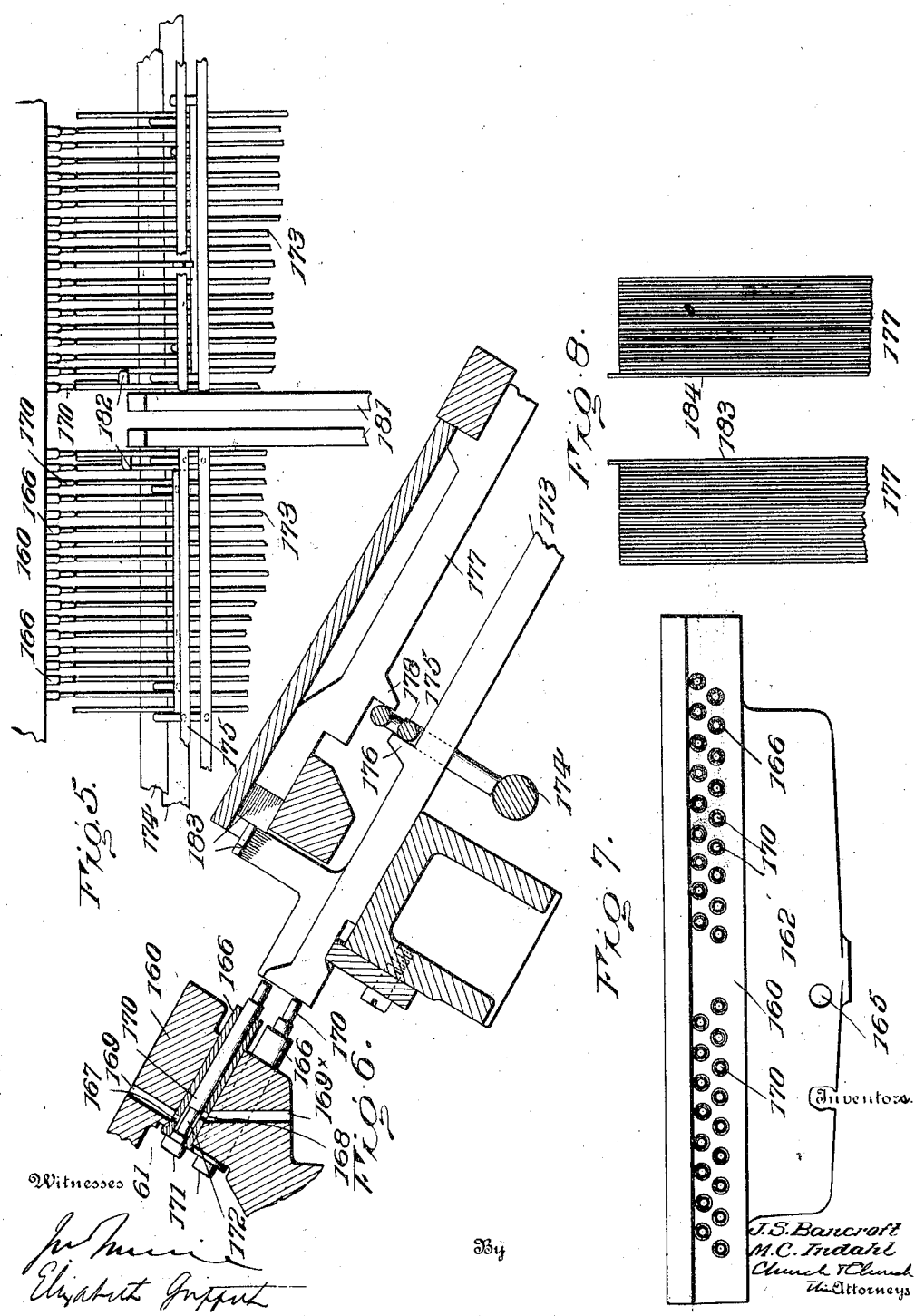

J. S. BANCROFT & M. C. INDAHL.
RECORD STRIP COMPOSING MACHINE.
APPLICATION FILED JUNE 5, 1908.

944,405.

Patented Dec. 28, 1909.
13 SHEETS—SHEET 6.

Witnesses

Inventors
J. S. Bancroft
M. C. Indahl
by
Church & Church
their Attorneys

J. S. BANCROFT & M. C. INDAHL.
RECORD STRIP COMPOSING MACHINE.
APPLICATION FILED JUNE 5, 1908.

944,405.

Patented Dec. 28, 1909.
13 SHEETS—SHEET 7.

Witnesses

Inventors.
J. S. Bancroft
M. C. Indahl
by
Church & Church
their Attorneys

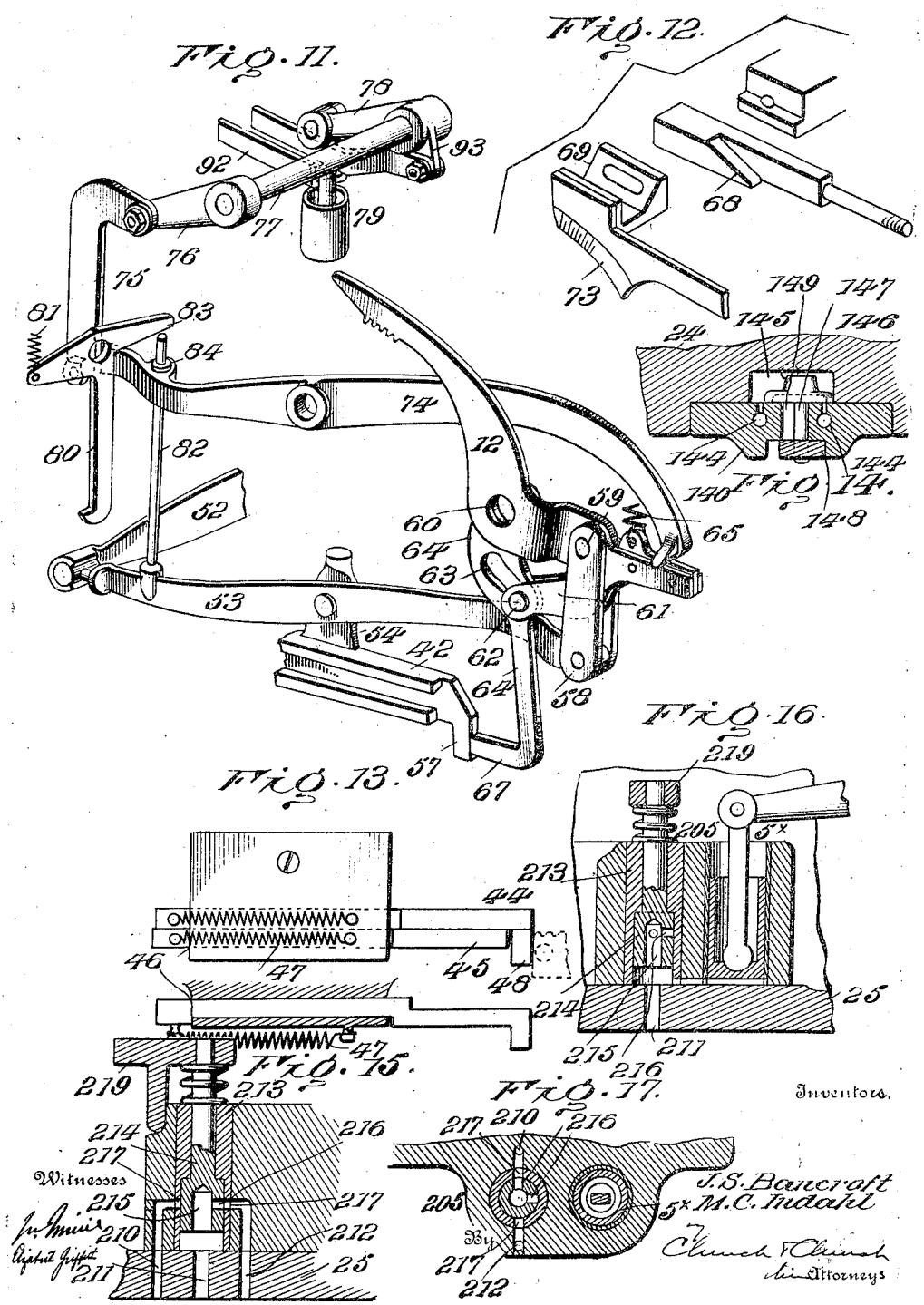

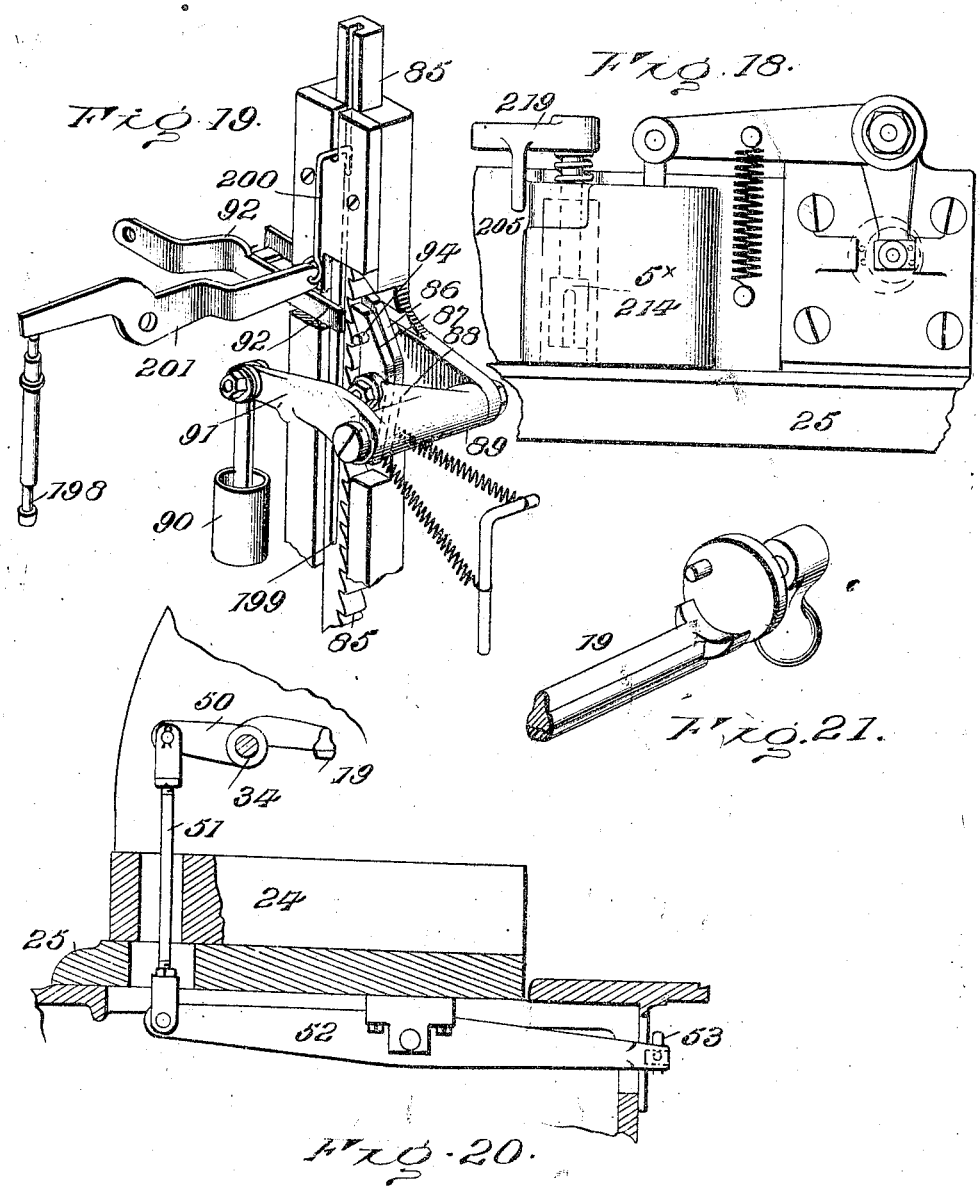

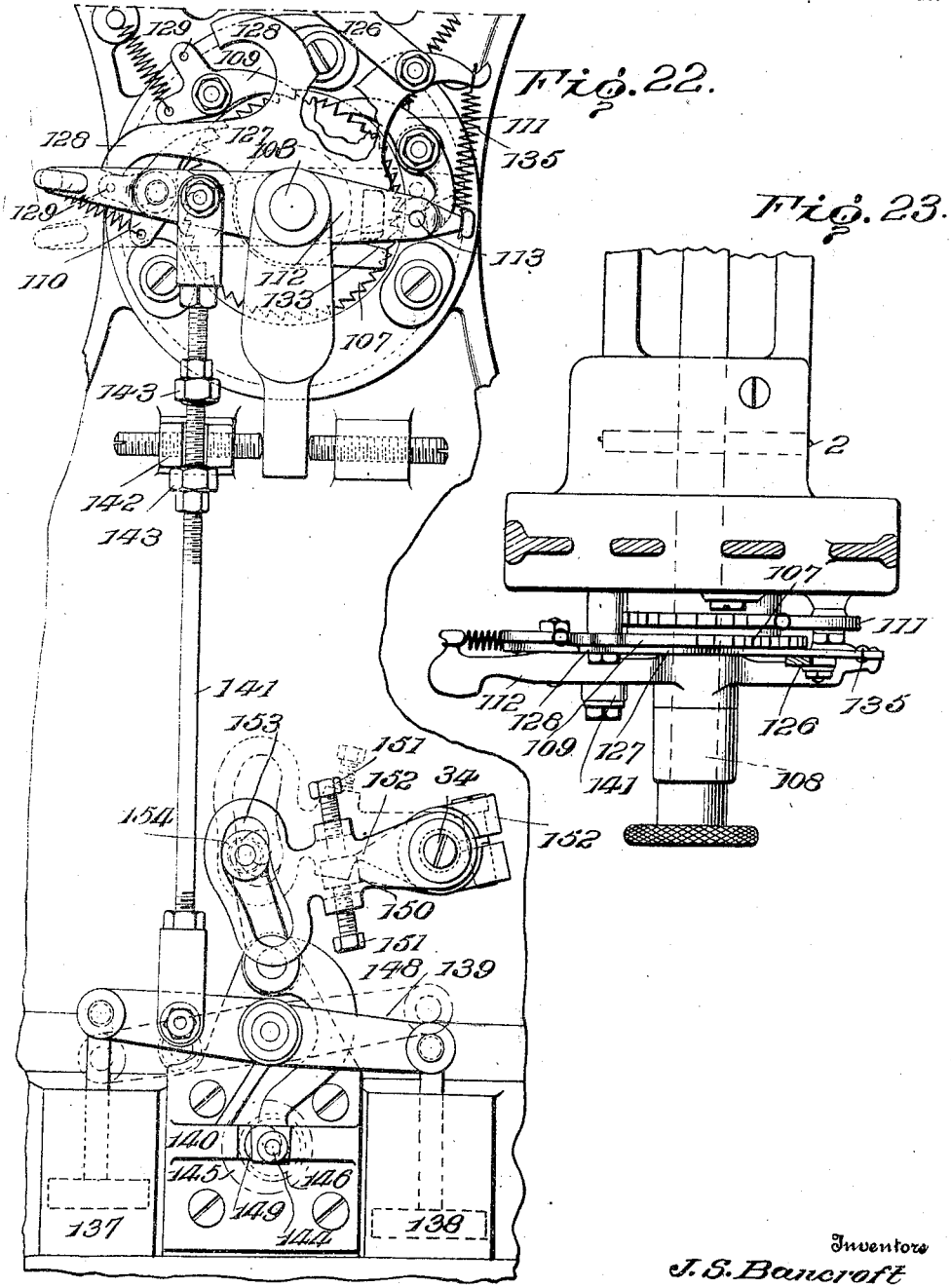

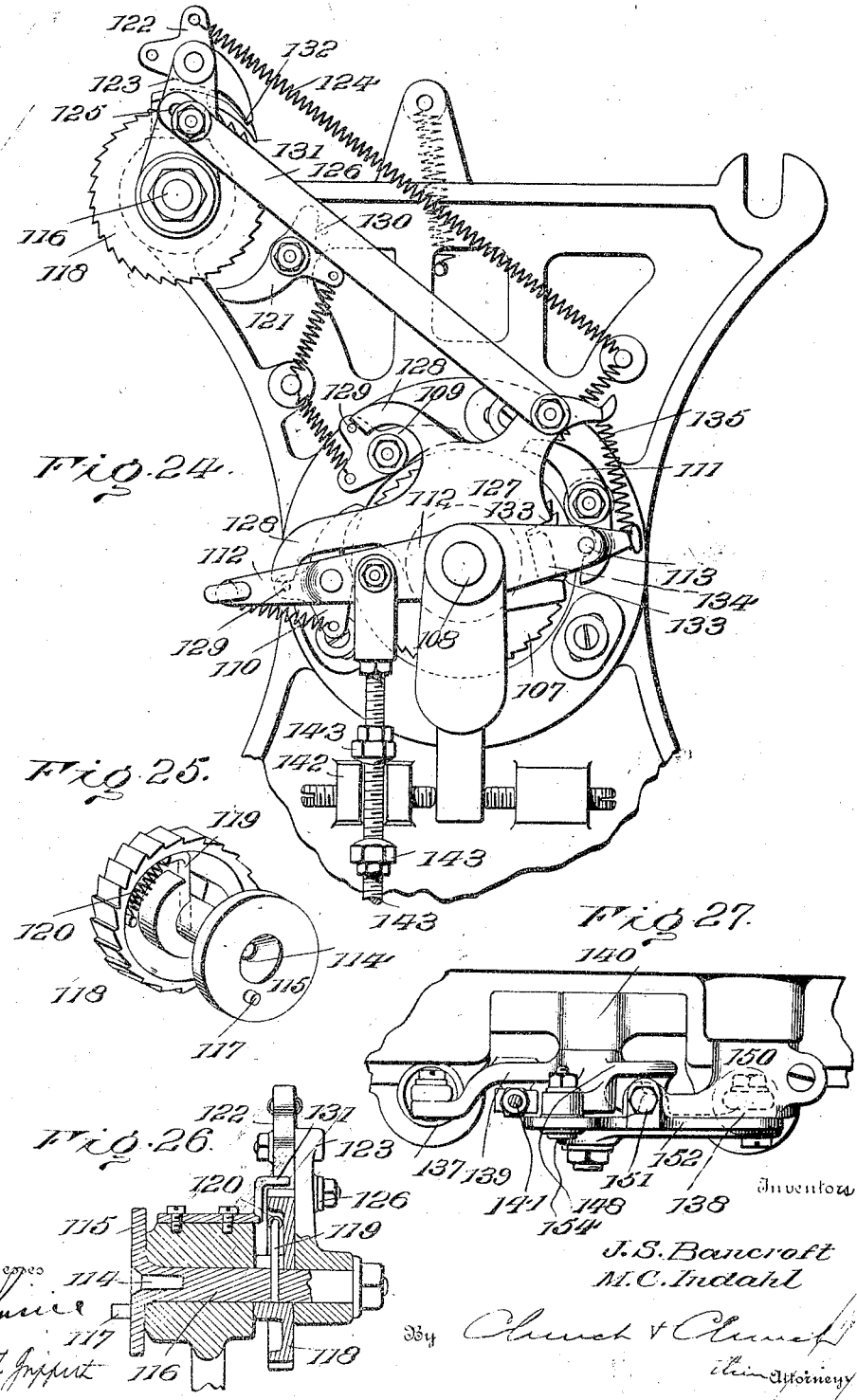

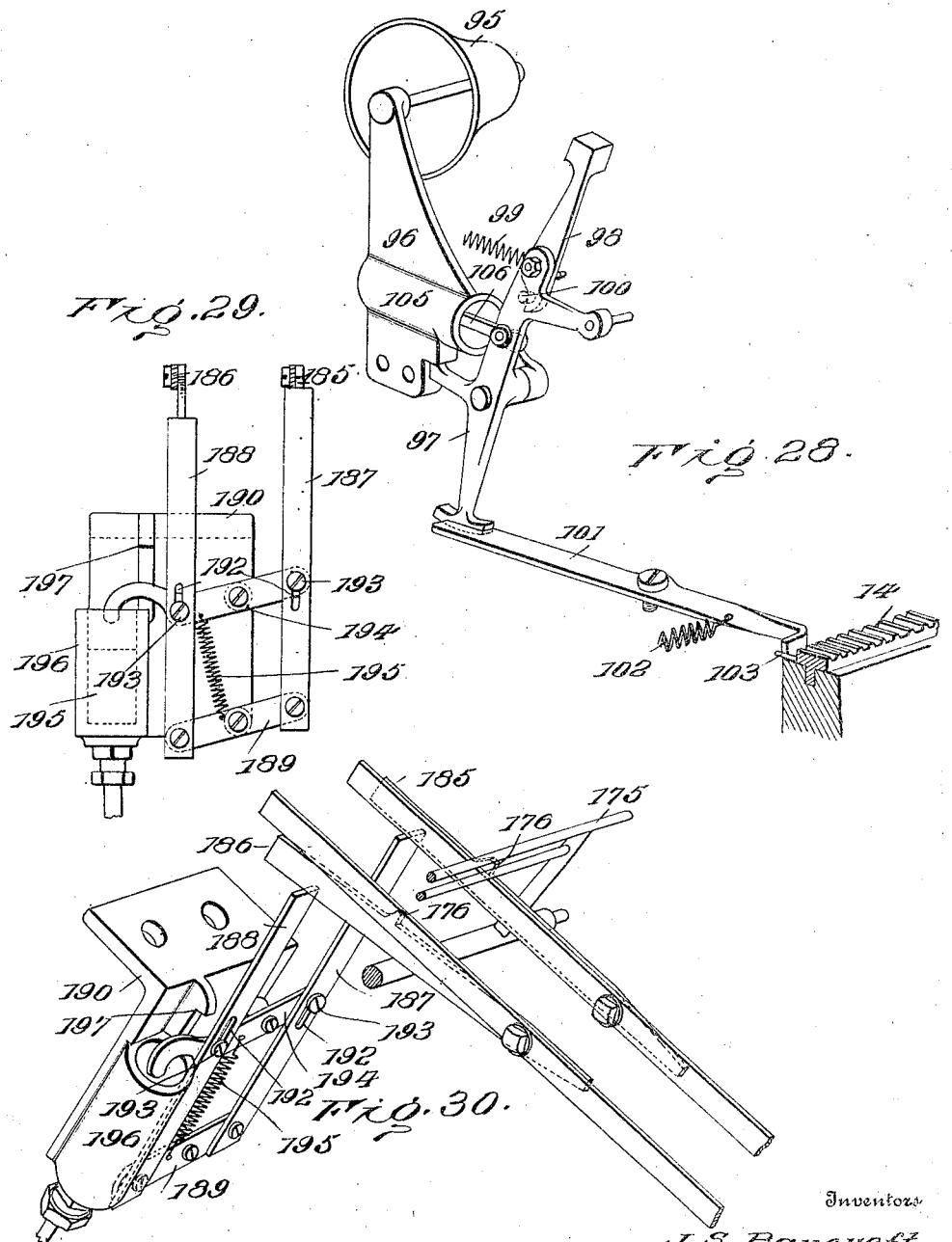

UNITED STATES PATENT OFFICE.

JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

RECORD-STRIP COMPOSING-MACHINE.

944,405. Specification of Letters Patent. Patented Dec. 28, 1909.

Application filed June 5, 1908. Serial No. 436,965.

*To all whom it may concern:*

Be it known that we, JOHN SELLERS BANCROFT and MAURITZ C. INDAHL, of Philadelphia, in the county of Philadelphia, State of Pennsylvania, have invented certain new and useful Improvements in Record-Strip Composing-Machines; and we do hereby declare the following to be a full, clear, and exact description of the same, reference being had to the accompanying drawings, forming a part of this specification, and to the reference characters marked thereon.

This invention relates primarily to that class of composing machines in which the matter, including line justification fractions, is set up in the form of perforations in a record strip or controller through the medium of a series of manually controlled punches, justification indicator mechanism and paper feed mechanism, and it has for its objects increased efficiency as to speed, ease of manipulation, certainty in action, durability and precision, to which ends the said invention consists in the several novel combinations, constructions and arrangements of parts as hereinafter fully described and pointed out in the appended claims.

Figure 2:
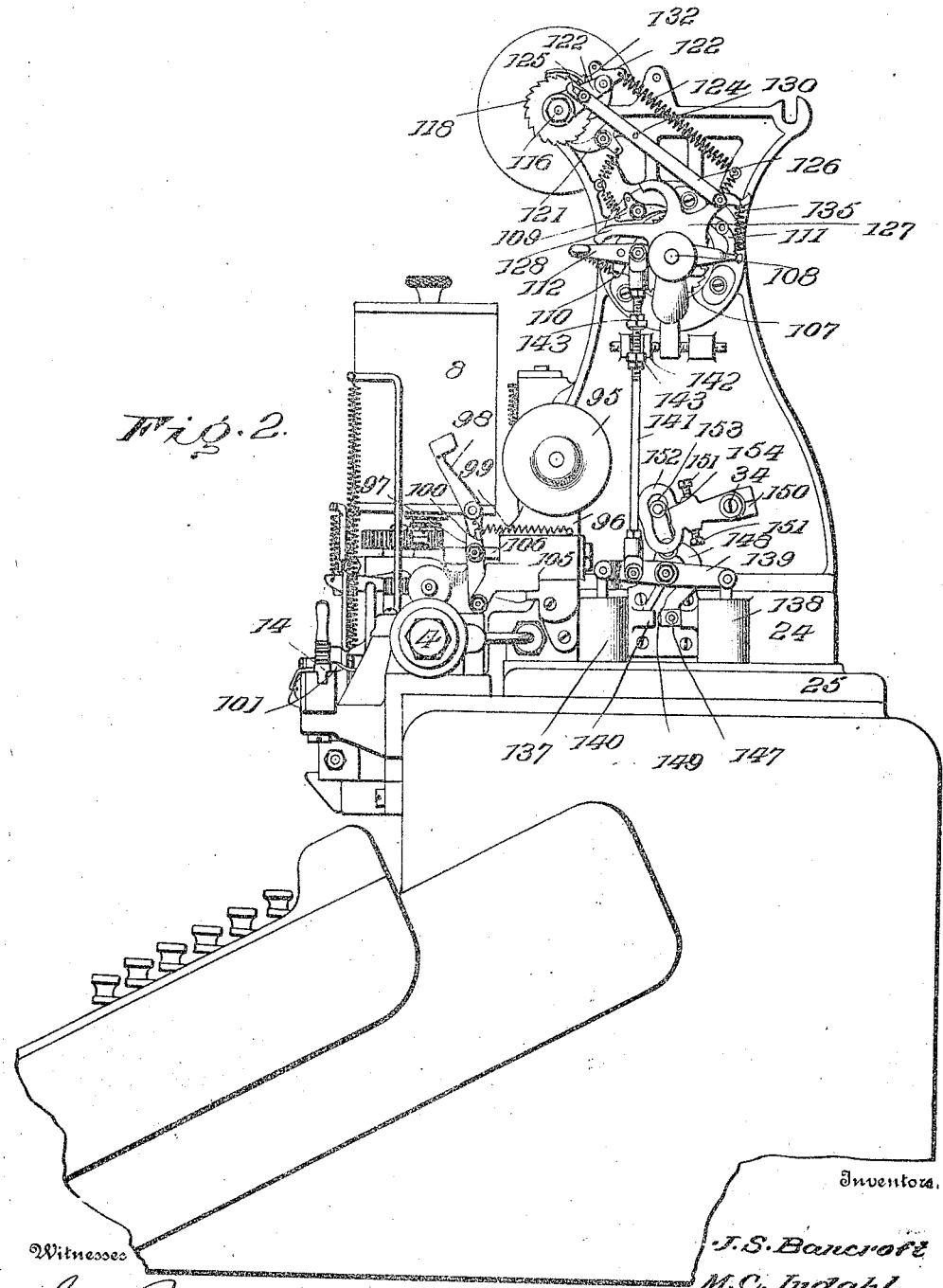
Figure 3:
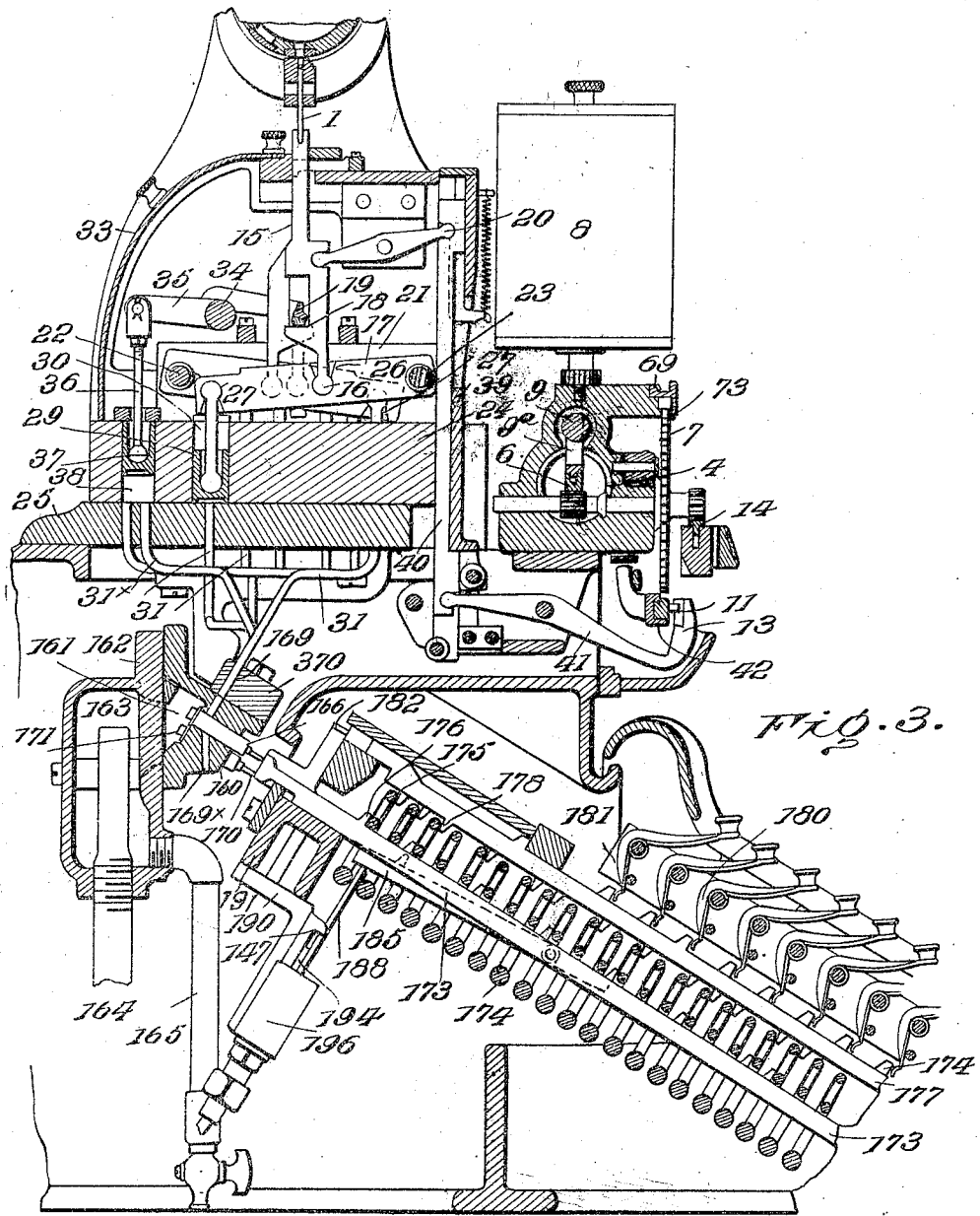
Figure 9:
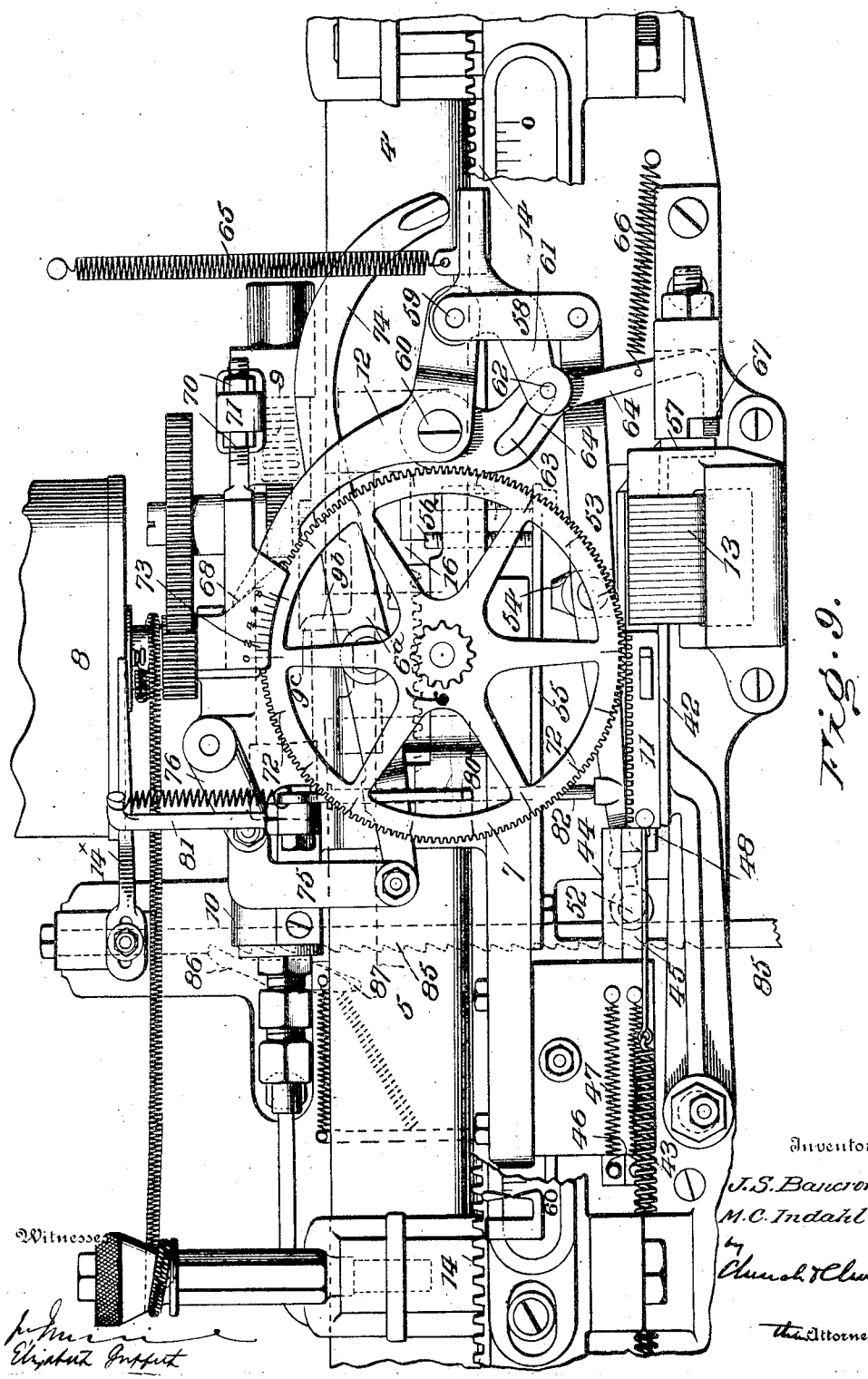
Figure 10:
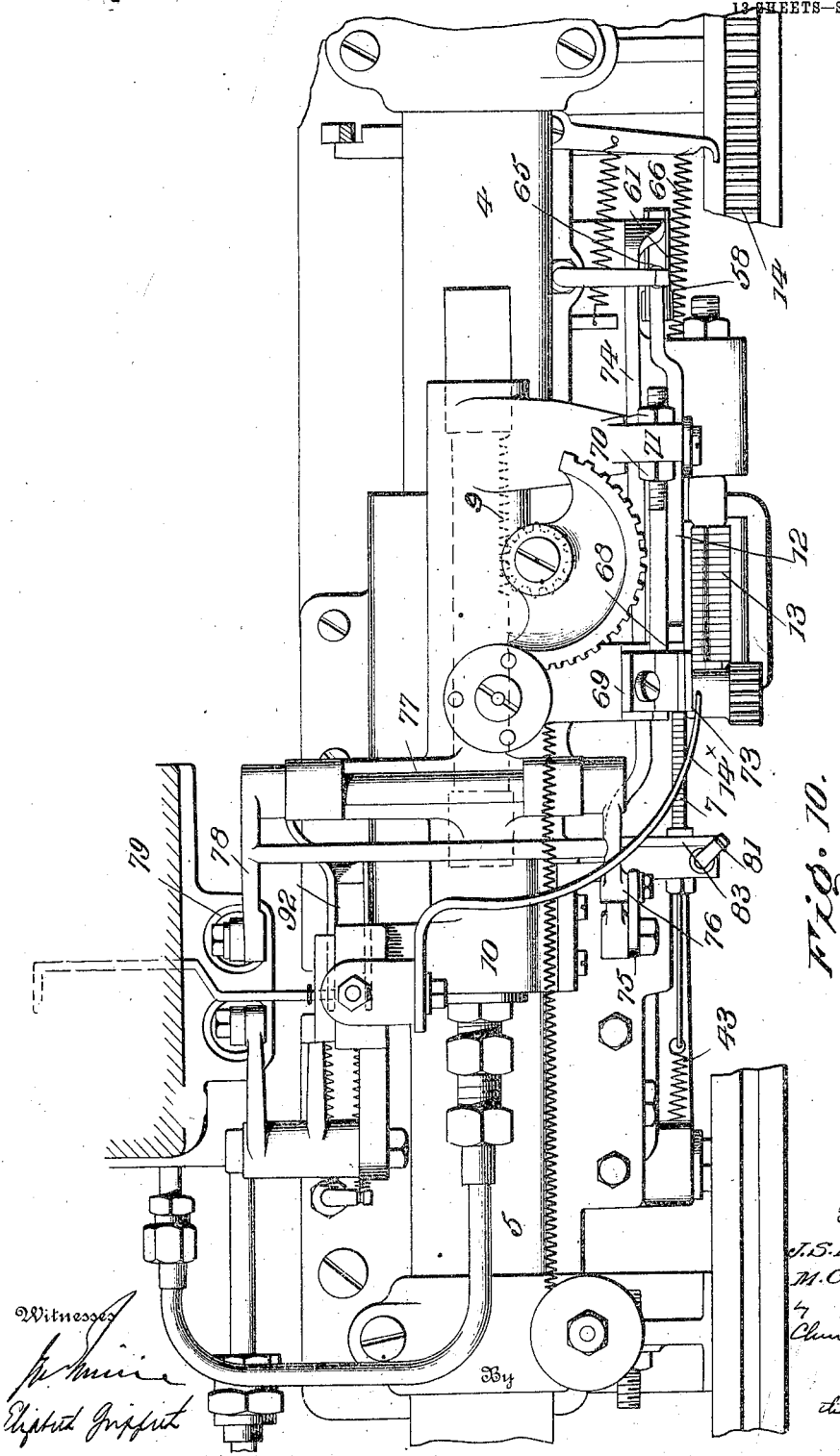
Figure 31:
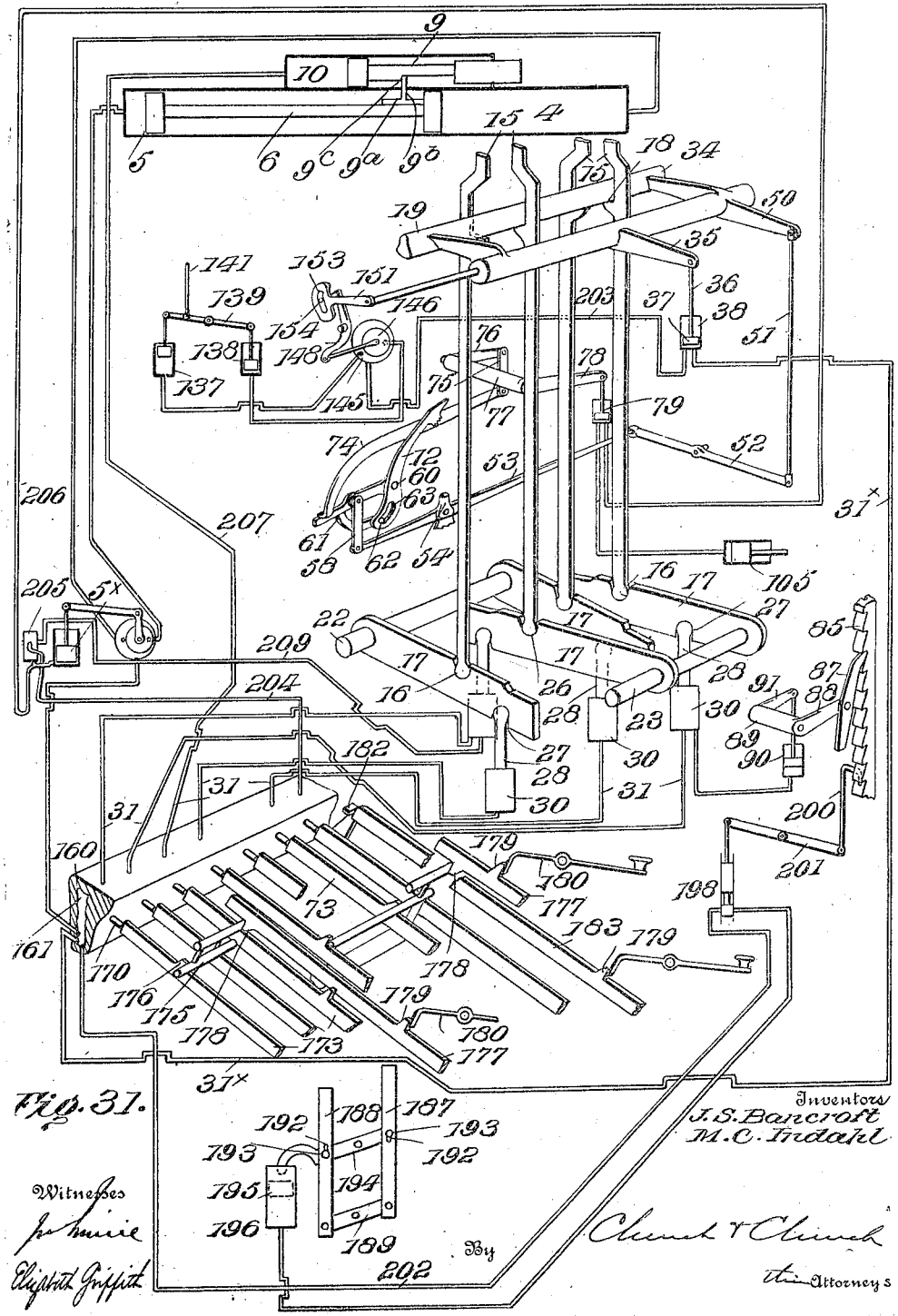

In the accompanying drawings illustrating a preferred form of embodiment—Figure 1 is a front elevation of the machine. Fig. 2 is a partial right end elevation. Fig. 3 is a transverse vertical section taken at one side of the justification indicator drum. Fig. 4 is a horizontal section immediately above the punch levers showing the disposition of said levers, their actuating motors and the punch bars. Fig. 5 is a top plan view of a portion of the valve actuating bars, valves and transmitting bars. Fig. 6 is a detail view partly in section illustrating the arrangement of the punch valves, actuating bars and key bars. Fig. 7 is a front elevation of the valve bar detached. Fig. 8 is a top plan view of the key bar layout.
Fig. 9 is a front elevation and Fig. 10 a top plan view on an enlarged scale of the justification mechanism including the line measuring and justification indicating devices. Fig. 11 is a perspective view of a portion of the escapement mechanism for the units wheel. Fig. 12 is a detail view showing the vernier scale, its support and the lifting incline for the units wheel holding pawl. Fig. 13 is a detail view of the units rack stop or arrester. Fig. 14 is a detached sectional view of the valve mechanism controlling the motor and motor return cylinders. Fig. 15 is a sectional view of the valve controlling communication between the resetting and justification valves and the resetting or restoring motor. Fig. 16 is a longitudinal section and Fig. 17 a transverse section through the controlling valve, Fig. 15, and the resetting motor. Fig. 18 is a side elevation of the controlling valve and the resetting valve and motor, Figs. 14 to 16, inclusive. Fig. 19 is a perspective view of the justifying space bar actuating devices and connections, shown detached. Fig. 20 is a detail view of the universal bar acted upon by the punch levers showing the manner of connection with the escapement of the line measuring device. Fig. 21 is a detail, in perspective of the lockout for the punches as applied to the universal bar. Fig. 22 is an end elevation, on an enlarged scale, of a portion of the paper feed mechanism, also showing the arrangement of the controlling valve of the motor and motor return cylinders. Fig. 23 is a top plan view of the paper feed ratchet mechanism. Fig. 24 is an end elevation of a portion of the paper feed mechanism showing the connections between the paper feed ratchet and take-up or winding roll. Fig. 25 is a perspective view of the ratchet head of the winding roll detached. Fig. 26 is a sectional view of said ratchet head showing parts of the actuating devices therefor. Fig. 27 is a top plan view of the paper feed motor and motor return valve actuating devices. Fig. 28 is a detail, in perspective, of the line signal mechanism. Fig. 29 is a front elevation and Fig. 30 a perspective view of the automatic shift for the justifying space key. Fig. 31 is a diagrammatic view showing the principal lines of transmission involved in the present construction.

Like characters of reference in the several figures indicate the same parts.

Although in many particulars applicable to other forms of machines the improvements are illustrated as applied to a monotype composing machine of the kind disclosed in Patent 828,449, of August 14, 1906, whereof 1 represents the series of punches; 2 the pin wheels of the paper feed; 3 the spindle of the take-up roll; 4 the motor cylinder; 5 the motor-return cylinder; 6 the motor rack; 7 the units wheel; 8 the justification indicator drum; 9 the justification indicator rack coöperating with the motor rack for positioning the indicator drum; 10 the justification indicator drum motor; 11 the units rack; 12 the units wheel holding pawl; 13 the series of stop bars; 14 the line scale rack; 14* the justification pointer; and 5× the resetting motor.

With the exception of the connection between the motor and justification rack the mechanism as thus far described does not differ essentially in construction and mode of operation from the corresponding elements of the before mentioned patent taken in connection with No. 654,115, upon which the same purports to be an improvement. Instead of coupling the justification indicator rack 9 with motor rack 6 through the pinion communicating motion from the first named rack to the transmission gearing for the indicator drum, the teeth of rack 9 are formed on the front of the justification indicator drum piston rod with the driving pinion of the transmission gear mounted upon a vertical shaft and the slide 9$^a$ carried by motor rack 6 in position to contact with its gaging shoulder is provided with an arm or off-set 9$^b$ in position to engage a shoulder 9$^c$ on the justification indicator rack, all as clearly indicated in Figs. 9 and 10, whereby the advance of the justification indicator rack 9 under the influence of its motor is transmitted to the indicator drum and the degree of motion measured by the contact of slide 9$^a$ with the gaging shoulder on the motor rack.

To facilitate assemblage, equalize the action, prevent lost motion and condense the mechanism into a small space the following arrangement of punch actuating mechanism has been devised and adopted. Each punch 1 is detachably secured to the end of one of a series of punch bars 15 (Figs. 3, 4 and 31) the latter composed of thin strips of metal provided at their lower ends with semi-circular heads 16 for attachment to the actuating levers 17, and cut away at one edge to form a bearing 18 for the reception of the universal bar 19; said bearing and bar being located substantially in the plane of the punch. Alternate pairs of punch bars 15 stand in reversed position with the universal bar lying in the interval between them, and such of the punch bars as are assigned to dimensioning purposes are each provided with a socket for the reception of one of a series of levers 20, the latter pivoted in bearings in the frame of the paper tower and serving to transmit motion to the corresponding stop bar 13, as hereinafter explained.

The punch bar levers consist of bars 17 of uniform width arranged side by side between cheek pieces 21, the latter connected at opposite ends by rods 22 and 23, said cheek pieces and rods forming a supporting and guiding frame for the punch levers, said frame being detachably secured to the upper face of a cylinder-block or plate 24, the latter removably secured to the conduit terminal plate 25.

Alternate levers 17 are pivoted upon opposite rods 22, 23 at the front and rear of the punch bar lever frame, and each lever is formed or provided on one side with a recessed bearing 25 for the reception and accommodation of the head 1* of its punch bar 15, the latter being maintained in place by contact with the adjacent lever 17. In addition, each lever 17 is provided with a similar recessed bearing 27, opening downward and adapted to receive the semicircular head of a link 28, the opposite end whereof engages a piston 29, the latter working in one of a series of cylinders 30 formed by boring through the cylinder block or plate 24, the lower ends of said cylinders being closed by the conduit terminal plate 25, upon which said block or plate 24 rests and to which it is secured.

Cylinders 30 are disposed in series on lines diagonal to the levers 17, to bring one cylinder opposite each lever, and at points equidistant from the punch bar bearings 26, as indicated in Fig. 4. The pipes 31, through which pressure is admitted to the cylinders 30 beneath the pistons, are properly secured as by expanding their ends in openings drilled in plate 25.

The paper tower frame, instead of being secured directly to the base frame, is detachably mounted upon cylinder block 24, and is provided with a removable back plate 33 to permit access to be had to the punch actuating mechanism. Universal bar 19, which responds to the action of any one or more of the punch bars 15, is carried by a shaft 34 pivotally mounted upon the uprights of the paper tower frame and provided with an arm 35 coupled by a link 36 with a piston 37, the latter working in a cylinder 38 in block 24, opposite a supply pipe 31* in plate 25.

The cylinder of piston 37 is in open communication with the source of pressure and while the several pistons and cylinders are of the same dimensions the transmitting devices and loads are so proportioned and disposed that the pressure exerted by a single punch bar piston 29 will be insufficient to displace the universal bar 19, thus requiring the conjoint action of two or more pistons 29 to actuate the punches and raise the universal bar against the adverse pressure of piston 37.

By the described arrangement, particularly the location of the punch actuating devices within the paper tower and above its point of attachment to the main frame, not only is the latter materially reduced in size but the parts are rendered much more accessible, for by simply releasing the fastenings of the paper tower the latter, together with the punching mechanism can be removed to uncover the cylinder block or plate 24, and by the removal of the latter the system of supply pipes 31, 31˟ attached at opposite ends to the connected plate 25 and bar 37° in fixed relation can be withdrawn or inserted.

As illustrated in Figs. 1, 3 and 4, the front wall or plate of the paper tower or frame is cut away to admit a coupling unit similar to that disclosed in Patent 828,451, of August 14, 1906, for transmitting motion from one or more of the series of levers 20 pertaining to the dimensioning punches, the same comprising a frame 39 containing a series of longitudinally movable bars 40 adapted to be detachably coupled with levers 20 at one end and with the members of a series of levers 41 carrying the stop bars 13, the latter serving to limit the movement of the units rack when in engagement with the units wheel to admeasure the advance of the latter and of the line measuring and justification indicating mechanisms.

Units rack 11 is supported to reciprocate longitudinally in bearings on the units rack carrier 42, the latter pivotally attached at one end to the frame of the line measuring mechanism. The return of the units rack, after the measuring movement in engagement with the units wheel is completed, is effected by a spring 43, and notwithstanding the relatively small weight of the units rack the impact upon its zero stop is sufficient at times to break the latter or to cause such a rebound of the units rack as will seriously interfere with its correct action, more especially when the machine is operated at a high rate of speed. To overcome this defect a cushioning zero stop, Figs. 9 and 13, has been applied, one adapted to absorb the inertia of the units rack and bring it to rest in proper position for immediate reëngagement with the units wheel. It comprises two bars 44, 45, supported to reciprocate longitudinally in ways on the frame and each provided with a limiting stop or shoulder 46 and a spring 47, the latter tending to restore or retain said stop in engagement with an abutment on the frame. One of said bars (44) is provided with an offset projection 48 interposed between the units rack and the companion bar 45, but slightly removed from the latter as indicated in Fig. 13. The pressure exerted by spring 47 connected with bar 44 and tending to maintain its shoulder 46 in engagement with the opposing abutment is superior to that exerted by the units rack spring 43 when the units rack is at rest in contact with said bar 44, the latter then serving as a zero stop for the units rack. When, however, the units rack is withdrawn from the units wheel and is impelled by its spring toward bar 44, if the inertia of motion of the units rack exceeds the resistance of spring 47, bar 44 will be forced back until it contacts with the other bar 45. The inertia of the units rack being thus absorbed and the latter brought to rest the superior pressure of spring 47 at once advances bar 44 and the units rack to zero position.

Universal bar 19 is coupled with both the units rack carrier 42 and units wheel retaining pawl 12 through the medium of arm 50, link 51 and levers 52 and 53 (Figs. 9, 10, 11 and 31) in the following manner. The units rack carrier 42 is provided with an off-set 54 to which lever 53 is pivotally attached at a point intermediate the ends of said lever, said off-set being arranged to contact with an adjustable stop 55 on the frame when the carrier is advanced to fully engage the units rack and units wheel. A convenient stop is formed by a spring bar supported on the frame and provided with a deflecting screw 56 for adjusting the point of contact with the stop. The units rack carrier 42 is also provided with a shoulder 57 for a purpose to be explained.

One end of lever 53 is connected by a link 58 to the retaining pawl in rear of its pivotal point of support 60. Mounted upon pivot 59 of link 58 is a link or lever 61 carrying a pin or roller 62 engaging a slot 63 in a dependent arm 64 supported upon the pivot 60 of the retaining pawl. A spring 65 is connected to link 61 and arm 64 is provided with a light retracting spring 66 and with a toe 67 in position to engage the bearing or shoulder 57 on the units rack carrier when the latter is retracted.

With the parts in normal or inactive position, as represented in Fig. 9, the retaining pawl is held in engagement with the units wheel by spring 65, the latter operating to hold pin 62 on link 61 at the end of slot 63 and exerting a lifting action upon the heel of the retaining pawl, while link 61 prevents relative movement between said pawl and the arm 64, and the units rack carrier is suspended on lever 53 intermediate the point of attachment to actuating lever 52 and to the retaining pawl, with the units rack free of the units wheel. If now any of the punches are operated to raise the universal bar and project a stop bar into the path of the units rack the power end of lever 53 will be elevated, and, inasmuch as the retaining pawl is not only sustained by spring 65 but is positively locked in position by link 61 and arm 64, said lever fulcrums for the time being upon the retaining pawl and elevates the units rack carrier until its off-set 54 is brought into engagement with stop 55 which occurs when and not before the teeth of the units rack are fully engaged with those of the units wheel. This movement of the units rack carrier has the effect of withdrawing shoulder 57 from in front of the toe 67 of arm 64 and by the arrest of said carrier the fulcrum of lever 53 is transferred from the retaining pawl to the carrier so that the further movement of lever 53 operates to withdraw the retaining pawl against the action of spring 65, while maintaining the units rack in engagement with the units wheel. On the return movement of the universal bar, spring 65 operates to advance the retaining pawl and retain the units rack carrier against seat 55 until the movement of the former is arrested, when the fulcrum of lever 53 is transferred again to the retaining pawl and the units rack carrier is retracted to withdraw the units rack.

In the performance of its functions as a lock for preventing the withdrawal of the units rack prior to the full engagement of the retaining pawl and vice versa (for until the toe 67 is withdrawn from beneath the units rack carrier, by the seating of the retaining pawl the units rack cannot be retracted from its engagement with the units wheel) arm 64 might be attached directly to or formed integral with the retaining pawl; but the construction shown is adapted to facilitate the resetting or restoration of the line measuring mechanism, to which end the slot 63 is so formed as to permit the locking link 61 to be tilted on its pivot against the pressure of spring 65 while the retaining pawl is engaged with the units wheel and the units rack carrier lies in the path of arm 64, thus forming a tripping device for removing the barrier to the movement of said pawl relatively to arm 64 and permitting said pawl to be withdrawn from the units wheel so that the latter will be free to respond to the action of the motor return cylinder or other restoring devices.

To effect accurate measurements, such as are required, it is important to establish and preserve the proper correlation between the pitch lines of the teeth of the units wheel, units rack and retaining pawl when engaged. As before explained the units rack is provided with means for regulating the position of its teeth relatively to those of the units wheel when in engagement therewith, and similar provision is made as to the retaining pawl by the location of an adjustable wedge 68 in position to engage the end of said pawl when its teeth are in contact with the units wheel. As illustrated in Figs. 9 and 12 this wedge 68 is supported in a bearing block 69 detachably secured to the frame and is movable tangentially of the units wheel by adjusting nuts 70 applied to it on opposite sides of a bearing 71 on the frame.

The unit of measurement adopted for the line measuring devices is the one eighteenth of the pica em, represented by one tooth of the units wheel and the latter is divided by radial lines 72 into equal intervals of nine teeth representing one half em. To the outer face of block 69 is secured a vernier plate 73 containing ten equally spaced marks or lines the first and last of which coincide with the half em division marks on the units wheel, each representing one tooth on the latter. The purpose of this arrangement is to facilitate the setting or adjustment of the units wheel, to accomplish which, as well as to effect the return of the units wheel and connected mechanism to the zero point after the completion of each line, it is required that retaining pawl 12 should be capable of being withdrawn from the units wheel while the units rack is in its retracted position. This can be accomplished by the application of pressure on link 61 to overcome spring 65 and depress the end of bar 53, during which movement pin 62 rides in slot 63. The means provided for thus depressing link 61 includes a lever 74 whose free end overlies the rear extension of link 61, the opposite or power end being coupled by link 75 to a crank arm 76 on shaft 77, the latter provided with an arm 78 coupled to the piston of the tripping motor 79. To prevent racing of the units wheel a detent 80 is pivotally supported upon the frame in position to engage the arms of the units wheel. This detent is advanced automatically by a spring 81 and is positively retracted whenever lever 53 is operated (to engage the units rack and withdraw the retaining pawl) by means of a rod 82 projecting in the path of said lever 53 and operating upon an arm 83 of the detent 80. Rod 82 is also provided with a collar 84 above lever 74 and operating to positively retract the detent whenever said lever 74 is rocked to reset or restore the measuring devices.

Incidentally to the resetting action the holding and advancing devices of the space registering mechanism controlling the justification indicator pointer 14* are released. As illustrated in Fig. 19 these include a ratchet bar 85 movable longitudinally in guides on the frame and carrying pointer 14*; a holding pawl 86, and an actuating pawl 87, the latter carried on an arm 88 of a rock shaft 89 mounted on a bracket on the frame. The piston of the space motor 90 is connected to an arm 91 fast on shaft 89 so that, at each movement of the piston, bar 85 will be advanced one tooth and there held by pawl 86. To effect the withdrawal of pawls 86 and 87 simultaneously with the release of the units wheel, a trip 92, Figs. 11 and 19, coupled with an arm 93 on shaft 77 is arranged to engage pins or projections 94 on said pawls. The trip 92 is in the form of a furcated bar supported to reciprocate in bearings on the frame and extending on opposite sides of ratchet bar 85.

The signal mechanism for advising the operator when a line is nearly completed comprises a bell 95, Fig. 28, mounted upon a detachable support 96 to which latter is pivoted a lever 97 one arm whereof carries the striker 98 pivoted thereto and provided with a spring 99 and stop 100 both engaging below the pivotal point of support for said striker, while the other arm engages a notch in a latch 101, the latter held to place by a spring 102. The latch 101 stands in the path of a pin 103 on the line scale rack 14 and is withdrawn by said pin to permit the striker to engage the bell as the line scale pointer approaches the end of the line scale. A motor 105 mounted on the support 96 has its piston rod 106 coupled with lever 97 and serves to retract said lever so that the latch will automatically reëngage upon the return of the line scale rack.

The paper feed mechanism, best seen in Figs. 2 and 22 to 27 inclusive, includes reversed ratchet wheels 107, fast on the pin wheel shaft 108; a holding pawl 109; a feeding pawl 110; and a locking pawl 111. The feeding pawl 110 is carried by an actuating lever 112 pivoted upon shaft 108 and provided with a pin 113 for engaging the locking pawl 111, to throw the latter into engagement with the inner ratchet wheel at the end of the feeding stroke of said lever 112, the feeding pawl engaging the outer ratchet wheel whose teeth run in the reverse direction to those of the inner or stop ratchet wheel. As thus far described this mechanism does not differ essentially from that previously in use for propelling the pin wheels. The spindle 3 on which the take up spool is supported is, as usual, longitudinally movable to permit the insertion and removal of the spools, and its end is received in a socket 114 formed in a head 115, the latter carried by a shaft 116 supported in bearings on the paper tower frame and provided with a pin or projection 117 for interlocking with one end of the spool. Upon shaft 116 is loosely mounted a ratchet wheel 118 which is connected to the shaft, through the medium of an arm 119 and spring 120, said arm and spring occupying a recess formed in the inner face of the wheel as seen in Figs. 25 and 26. Ratchet wheel 118 is provided with a holding pawl 121 mounted on the frame and an actuating pawl 122 carried by an arm 123 loosely pivoted on shaft 116. Actuating pawl 122 is coupled with a motor spring 124 by which the winding movement is effected. Spring 124 is connected to pawl 122 and as thus arranged serves both to advance and retain said pawl in engagement with its ratchet wheel. Arm 123 is coupled by a slot and pin connection 125 with a link 126 whose opposite end is carried by a plate 127 loosely pivoted upon pin wheel shaft 108. This plate 127 is furnished with arms 128 in position to engage pins 129 on the holding and feeding pawls 109, 110, to withdraw said pawls from the ratchet wheels when said plate is turned back for the purpose, and link 126 is also provided with a shoulder or pin 130 in position to in like manner engage and withdraw holding pawl 121 of the strip winding devices. A shield 131 provided with a notch or shoulder 132 is mounted on the frame in position to engage, lift and retain pawl 122 when its arm 123 is thrown back, as will presently appear. Plate 127 is furnished with shoulders 133 between which plays a lug 134 on actuating lever 112 and said lever and plate are also connected by a spring 135.

When in normal or operating position at the conclusion of a feed movement the parts assume the position represented in Figs. 2 and 22, with the holding, feeding and locking pawls 109, 110, 111, 121 and 122, engaged and arms 128 and shoulder 130 held retracted beyond the range of movement of the several pawls controlled thereby. In this position locking pawl 111 is held in engagement with its ratchet wheel against the pressure of its retracting spring, and arm 123 is advanced under the pressure of its spring 124 to hold the strip taut on the winding roll. The range of motion of winding pawl 122 is in excess of the feed movement of the pin wheels as derived from a single reciprocation of actuating lever 112, in consequence of which the advance of said pawl under the action of its motor spring 124 is arrested by the strip before the actuating lever 112 completes its throw, which is permitted by the pin and slot connection and the play of lug 134 between shoulders 133. During the feeding movement actuating lever 112 makes a complete reciprocation, its motion in one direction releasing the locking pawl 111, retracting the feeding pawl 109, and oscillating plate 127 to return pawl 122 to initial or zero feeding position, during which movement the tension on the paper strip is maintained by spring 120, the ratchet wheel 118 being held stationary by pawl 121. Upon the reverse movement of lever 112, the pin wheel shaft is advanced and at the same time plate 127 is oscillated to withdraw opposition to the advance of pawl 122 under the action of its motor spring. When, as is not infrequently the case, it becomes necessary or desirable to release both the winding and feeding devices (winding roll and pin wheels) to permit the insertion or adjustment of the record strip, arm 123 is drawn back until its pawl 122 riding upon shield 131 is withdrawn from the ratchet wheel and engaged with shoulder 132. During this movement shoulder 130 engages holding pawl 121 to release the winding devices, and plate 127 is rocked against the pressure of spring 135 to bring its arms 128 into engagement with pins 129, thereby rocking lever 122 to disengage locking pawl 111 and withdrawing holding and feeding pawls 109, 110, thus releasing the pin wheel shaft so it can be turned in either direction.

The release of the winding and feeding pawls can be effected either by pressure applied to lever 112 or arm 123 or to the intermediate connections, and when it is desired to reëngage the driving devices it is only necessary to release pawl 122 from shoulder 132 when the parts will automatically return to operative positions.

The paper feed devices derive motion from a motor device preferably positively actuated in opposite directions and illustrated in the present instance by two cylinders 137, 138, Figs. 2, 4, 22 and 27, formed upon or attached to the cylinder block or plate 24 to the right of the paper tower frame. The piston rods of cylinders 137, 138, are connected respectively to opposite ends of a lever 139 pivotally supported upon a plate 140, the latter detachably applied to the cylinder block 24, one arm of said lever being connected by a rod 141 with the actuating lever 112 of the paper feed mechanism. This rod 141 passes through a lug 142 on the frame and is provided with adjustable nuts 143 for regulating the throw of the actuating lever. Each cylinder 137, 138, is provided with a supply passage 144 terminating in a port opening into a valve chamber 145, Fig. 14, formed between plate 140 and block 24 and in said chamber is arranged a valve 146 of the well known D-type carried by a pin 147 secured to a lever 148, the latter pivotally supported upon plate 140. Pin 147 works in an open slot 149 in plate 140 intermediate the two ports, said slot serving as a passage for the exhaust from either port when the latter is covered by the valve. Valve lever 148 is coupled, for action, with the universal bar 19 through an arm 150 detachably and adjustably secured to one end of the shaft on which said bar is carried, said arm extending between adjusting screws 151 carried by an arm 152 loosely mounted upon the universal bar shaft and provided with a cam slot 153, engaging a pin or roller 154 on valve lever 148. When the machine is at rest with the punches and universal bar retracted, valve 146 uncovers the port leading to cylinder 137 and pressure is admitted to advance and hold actuating lever 112 at one end of its stroke, cylinder 138 exhausting through passage 149. When, now, the punches are operated and the universal bar is advanced, valve 146 is shifted to admit pressure to cylinder 138 and open the exhaust of cylinder 137, thereby moving actuating lever 112 to the opposite extreme position and retracting the feeding pawl 109, thus inaugurating the feeding of the record strip which is effected when valve 146 returns to first position by the descent of the universal bar.

Having described the various changes, additions and improvements pertaining to the punching, paper feeding and line measuring mechanisms, to adapt the same for coöperative action, it remains to consider the keyboard and connections for controlling and coördinating the functions of said mechanisms. To the bar 370 in which the pipes 31 leading to the punch cylinders terminate is detachably secured a valve chest in the form of a block or bar 160 (Figs. 3, 6 and 7) provided with a longitudinal recess 161 and detachable cover 162, the latter recessed to form a pressure chamber 163 in open communication with recess 161. The pressure supply pipe 164 communicates with chamber 163 and is provided with a nipple located within said chamber opposite an imperforate section of the wall next recess 161 to prevent water of condensation from entering the valves. A draw off pipe 165 with valve is also connected with chamber 163 to afford means for removing water collecting therein. The bar 160 is further furnished with a series of valve seats, preferably in the form of sleeves 166 inserted in parallel openings in said bar, each sleeve being furnished with two ports 167, 168, located at different points in its length, the one communicating with an exhaust passage 169$^x$ in the base and the other with a passage 169 registering with one of the pipes 31.

Working longitudinally through each sleeve is a motor controller in the form of valve 170 provided with a head 171 seating on the inner end of the sleeve, the stem of said valve fitting the interior of the sleeve and being provided with a reduced section 172. The valves are seated by pressure in recess 161 and when so seated communication is established between the supply and exhaust passages by the reduced section 172, as shown in Fig. 6. The movement of the valve away from its seat closes the port leading to the exhaust passage, the supply port remaining open. For convenience, and to economize space, the valves are arranged in two ranks as shown in Fig. 7, and in the example given thirty-five valves are shown divided into two groups of seventeen and eighteen members, respectively, of which members thirty-three pertain to the punch cylinders, and one each to the justification drum motor, and the resetting or restoring devices for the line measuring mechanism, as will presently appear. It may here be remarked that although the machine is equipped with thirty-three punch cylinders and punch bars there are but thirty-one punches, two of the punch bars, i. e., those corresponding to the fifteenth row and column in the die case of the casting machine, being unprovided with punches but their cylinders being brought into action to assist in actuating the universal bar when but a single punch is called for.

Supported to reciprocate longitudinally in the front portion of the base of the machine are a series of valve controllers in the form of bars 173 (one for each valve stem and in alinement therewith) through which the several valves are operated, and beneath said bars is arranged a series of transmitting members in the form of a series of transverse rock-shafts 174 each provided with radial arms supporting two or more rods 175 (a single blade or rod might be employed) parallel with the axis of the shaft and overlying the bars 173.

Preferably the punch controlling members or bars 173 are separated by an interval into two groups, corresponding with the grouping of the valves, and each rock shaft is provided with two pair of rods 175, a pair for each group of valve bars. With certain exceptions to be hereinafter noted each punch controller or valve bar is provided with a shoulder 176 opposite one of the rods 175, each one of the latter operating as a transmitter of motion to the valve bar assigned thereto. Above the series of rods 175 and transversely thereof is arranged a series of permutation bars or members 177 separated into two groups corresponding with the rods 175 and valve bars 173 and each provided with one or more shoulders 178 in position to engage one or more rods 175 and thereby operate the valves assigned to the latter. Each permutation member is also provided with a shoulder 179 in position to be engaged by one of a series of pivoted keys 180, there being at least one key for each permutation bar. The keys are divided into two groups corresponding to the permutation bars and each group is mounted in a separate frame 181 which is readily removed to permit access to be had to the permutation bars beneath. By thus equipping the keyboard with separately removable keybanks, and correspondingly grouped permutation bars changes in the layout or distribution of characters is greatly facilitated as either keybank can be separately removed to uncover its group of permutation bars and permit rearrangement of the keys or permutation bars without disturbing the arrangement of the companion keybank. There is one permutation member for each key and one controlling member for each punch, and through the transmitters each permutation member is enabled to actuate any one or more of the punch controlling members, the selection depending upon the disposition and number of its shoulder 178.

Two of the valve bars 173, those assigned to the resetting devices and the justification indicator drum motor 10, are unprovided with engaging shoulders 176 and are not acted upon by transmitting members 175 but are each equipped with an offset portion or lateral extension 182 (Figs. 3, 5, 6 and 31) in line with their keybars, of which latter 183 represents the restoring or resetting key and 184 the justification indicator key.

For a purpose to be hereinafter explained two of the valve actuators or bars 173 (one corresponding to the cylinder for the punch bar representing the fifteenth row in the die case which has no punch and the other that assigned to the motor of the justifying space signal punch) have their engaging shoulders 176 mounted upon supplemental pivoted bars or members 185, 186, (Figs. 29 and 30) the arrangement being such that the shoulders 176 of said actuators may be moved into or out of the path of the transmitting members 175 pertaining thereto so that the latter may be caused to actuate either, both, or neither of said valve actuators depending upon the position occupied by said shoulders.

The special object had in view is to change the signal produced by the justifying space key from a justifying to a non-justifying space after a predetermined number of justifying space signals have been produced in the line. In practice the justifying space signal comprises two perforations—a designating and a positioning factor—the former operating through the transfer mechanism of the casting machine to bring into action the justifying mechanism, whereby the body width of the space is increased an amount predetermined by the justification signal for the line, and the other for selecting the column of the die case containing the blank matrix. Now the column selecting perforations are produced by the dimensioning punches or those controlling stop bars 13, hence, in actuating the column selecting punch pertaining to the justification space signal, the stop bar corresponding therewith is advanced into the path of the units rack and would be recorded on the line measuring mechanism were it not for the fact that the punch assigned to the designating factor of the signal controls a stop bar nearer the units rack. The justifying space matrix is usually located in the six unit row, and the punch for producing the designating factor of the signal is connected to the first or four unit stop bar 13, in consequence of which, although the six unit stop bar is exposed, the units rack is intercepted by the four units stop bar and that amount is registered by the line measuring mechanism for each justification space type signal produced. In the present instance the valve actuator 173 with which the supplemental bar 185 carrying engaging shoulder 176 is associated is assigned to the punch representing the designating factor of the justifying space signal, and it is obvious that if said supplemental bar is moved to withdraw its shoulder 176 from the path of the transmitting member 175 (the latter deriving its motion from the justification space key and being coupled with the bars 173 of the space designating and selecting punches) the designating punch controlled by said valve actuator will not operate in response to the justifying space key and the signal produced will consist of the single dimensioning perforation incident to the operation of the column selecting punch; and, further, that the signal so produced will be complete without the justification designating factor; will be recorded as of the value of the column represented; and will be operative in the casting machine to produce a space dimensioned to accord with the column without bringing into action the justifying devices. Any appropriate means may be employed for operating the supplemental bar 185 to throw in or cut out the designating punch pertaining to the justification space devices, and the same may be controlled either manually or automatically, preferably the latter, in which case the mechanism for advancing the justification pointer is utilized as the controlling element. Such a mechanism is illustrated, modified to suit the requirements of the present machine with respect to the employment of two punch cylinders acting in conjunction to overcome the continuous pressure devices connected with universal bar 19 for retracting the latter, to which end provision is made whereby the cylinder of the punch bar pertaining to the fifteenth row and which does not produce a perforation is substituted for the designating punch cylinder when the supplemental bar 185 is operated to withdraw its engaging shoulder 176.

Referring to Figs. 3, 29 and 30, wherein the valve actuating bars of the space signal designating punch and fifteenth column blank punch bar cylinders are represented, it will be seen that the supplemental bars 185, 186, engage the upper ends of two links or bars 187, 188, the latter carried upon a transverse lever 189, pivoted at a point intermediate said links upon a supporting plate 190 detachably secured to the cross bar 191 of the keybank frame.

Each link 187, 188, is provided with a longitudinal slot 192 in which plays one of a pair of pins 193 carried by a second lever 194, the latter also pivoted to plate 190 intermediate said pins. A spring 195 connected to lever 189 near its pivot and to lever 194 on the same side but more remote from its pivot operates to normally maintain link 187 in its retracted and link 188 in its advanced position, where it contacts with the valve bar and is arrested thereby, so that the shoulder 176 of supplemental bar 185 will project into the path and the shoulder of supplemental bar 186 be withheld from the path of its transmitting member 175. One end of lever 194 projects into the path of a piston 195, working in a cylinder 196 on plate 190, the arrangement being such that when pressure is admitted to the cylinder, lever 194 will be tilted until arrested by contact with a stop 197. The parts are held in normal position, Fig. 29, by virtue of the preponderating action of spring 195 on lever 194 with link 187 in advanced position, to present the shoulder 176 of supplemental bar 185 to transmitting bar 175 thus causing the space designating punch to operate when the justifying space key is depressed. When, however, lever 194 is suddenly tilted, as by the admission of pressure to cylinder 196, its pins 193 ride in slots 192 and lever 189 is tilted through the medium of spring 195; thus the withdrawal of supplemental bar 185 and advance of 186 is effected by a yielding pressure so as not to interfere with the return of transmitting member 175 should the latter at the time be in advanced position or above the shoulder 176. In the present instance the admission of pressure into cylinder 196 is effected through a valve 198, Fig. 31, controlled by the space ratchet bar 85, to which end the latter is provided with a shoulder 199, Fig. 19, so related to the feeding devices that when a predetermined number of justifying spaces have been designated it will engage a trip 200 carried by lever 201, the latter connected to said valve 198.

Preferably the several motors and valves are coupled with and receive pressure from the pressure chamber 163 in bar 160, as follows: through pipe 202 to valve 198 and thence to cylinder 196; through pipe $31^x$ to cylinder 38 of universal bar 19, thence by pipe 203 to the supply port of the paper feed valve 146; from the valve of the justification space designating punch through one of the pipes 31 to the cylinder of said punch, thence to space motor 90; from the several character and justification punch valves (of which but two are shown connected) through pipes 31 to the respective cylinders of said punches; from the resetting or restoring valve through pipe 204 to a directing valve 205, thence by a pipe 206 to resetting motor $5^x$, tripping motor 79 and bell restoring motor 105; from the valve of the justification indicator through a pipe 207, to the justification indicator drum motor 10; and from one of the justification designating punch valves through one of the pipes 31 to the cylinder of said valve and thence by pipe 209 to valve 205, pipe 206, trip and resetting motors 79, 5ˣ and bell motor 105.

The directing valve 205, shown more fully in Figs. 15, 16 and 17, is employed to enable the operator to set the machine so the resetting and tripping motors 5ˣ and 79 controlling the motor and motor return cylinders 4, 5, and retaining pawls, may be operated by either the resetting key or one of the justification keys, as desired.

It is to be borne in mind that the machine is equipped as usual with two series of justification keys each pertaining to a different adjusting system in the casting machine. Each series of justification keys has a designating punch common to it but different from that of the other series, the justification signal being compounded of two sets of perforations each made up of a designating and one of a series of dimensioning factors. The terminal plate 25 is provided with three ports or openings 210, 211 and 212, the central one receiving the end of pipe 206 leading to resetting motor 5ˣ, while those on opposite sides receive pipe 209 leading from the cylinder of the justification designating punch and pipe 204 leading from the resetting valve. Above these ports block 24 is bored out to receive a bushing 213 containing a valve 214 the latter provided with a central opening 215 in one end communicating with port 211 and one or preferably two lateral ports 216 disposed at approximately right angles. The bushing is provided with two ports 217 each communicating through passages 218 in block 24 with one of the ports 210, 212. By means of a handle 219 the valve can be turned or set to establish communication between the resetting motor 5ˣ and either pipe 209 or 204, to render said motor responsive to the resetting key or the justification keys, as desired.

Having thus described our invention, what we claim as new and desire to secure by Letters Patent, is:—

1. A composing machine such as described, embodying the following elements in combination, to wit; a line measuring mechanism including a reversing valve, an indicator motor and a controlling valve for the latter; a plurality of punch bars each equipped with a motor and a controlling valve; a universal bar coupled with the punch bars and provided with a motor in open communication with the pressure supply for the punch bar motors; a motor for the reversing valve of the line measuring mechanism; alternative pressure supply connections for said motor including a directing valve, a special valve coupled with a controlling member, and the control valve of a punch bar motor; a space registering mechanism provided with a motor controlled by the valve of one of the punch bar motors; a plurality of controlling members each provided with a movable shoulder for engaging a transmitting member and means for advancing and retracting said engaging shoulders; a motor for said last named means; and a valve controlling said last named motor and coupled with the space registering devices.

2. In a composing machine such as described and in combination with the motor of the reversing valve for the line measuring mechanism, means for actuating said motor from either the resetting key or a justification key, at will, the same including a directing valve controlling lines of communication between said motor and a valve controlled by the resetting key and the controlling valve of the justification designating punch bar.

3. In a composing machine such as described and in combination with the control valve of the paper feed motor and the motor actuated universal bar engaging the punch bars and coupled with said control valve to actuate the latter, a pressure supply and connections between the latter and said universal bar motor and the inlet of the paper feed control valve.

4. In a composing machine such as described and in combination with the line measuring mechanism thereof, including a motor controlled reversing valve, a motor controlled holding pawl and a motor for restoring the signal devices, a supply conduit common to said motors connected to the pressure supply and controlled by a valve.

5. In a composing machine such as described, provided with a series of punch-bars, a universal bar adapted to be engaged by the punch-bars, and a paper feed mechanism provided with an actuating motor and a valve controlling said motor, and in combination therewith actuating devices intermediate said valve and universal bar, the same including a lever coupled with the valve and provided with a stud or pin, a pivoted link slotted to receive said stud or pin, and an arm on the universal bar shaft provided with opposed adjusting screws between which is received said pivoted link.

6. In a composing machine, provided with a series of punch bars each equipped with a motor and control devices therefor, and in combination therewith a sectional keybank, each section containing a plurality of keys; and a permutation system intermediate the keys and motor control devices through which any key of either section may be coupled with any one or more of said control devices.

7. In a composing machine, equipped with a plurality of punch-bars and controllable actuating devices therefor and in combination therewith two series of keys separately mounted in removable frames, and a transmitting system intermediate the keys and actuating devices through which the keys of both series may be connected to the actuating devices of any one or more punch-bars.

8. In a composing machine the combination of the following elements, to wit; a perforating mechanism including a plurality of punch-bars each provided with a motor and a controller therefor; a series of key controlled permutation members; and transmitting devices intermediate said permutation members and motor controllers arranged and adapted to be thrown into and out of engaging position, to couple or uncouple a permutation member with its motor controller as desired.

9. In a composing machine the combination of the following elements, to wit; a punching mechanism including a plurality of punch bars each provided with a motor and a controller therefor; a plurality of actuating bars or members, one for each motor controller; transmitting devices; and a detachable means for coupling said transmitting devices and actuating members.

10. In a composing machine provided with a plurality of punch bars each equipped with a motor, a controller and an actuating member therefor and in combination therewith a transmitting member detachably coupled with said actuating member.

11. In a composing machine provided with a plurality of punch bars including designating and dimensioning members, each equipped with controllable actuating devices and in combination therewith, a plurality of transmitters controlling said actuating devices, singly or in multiple, and controllable means for alternately connecting and disconnecting one of said transmitting and actuating devices.

12. In a composing machine provided with a plurality of punch bars, including designating and dimensioning members, each equipped with controllable actuating devices, and in combination therewith, a plurality of transmitters controlling said actuating devices, and controllable means for coupling a transmitter with either of two of said punch bar actuating devices.

13. In a composing machine the combination of the following elements, to wit; a plurality of punch bars; a controlling member for each punch bar; a plurality of permutation members; a plurality of transmitters intermediate the permutation and controlling members one of said transmitters being coupled with a plurality of said controlling members; a line measuring mechanism provided with a plurality of admeasuring devices of which latter two are coupled with the last named controlling members; and means for uncoupling the controlling member pertaining to one of said admeasuring devices.

14. In a composing machine provided with line measuring and space counting mechanism, the former equipped with a series of admeasuring devices, and in combination therewith, actuating devices coupled with a plurality of said admeasuring devices, and means under the control of the space counting devices for suspending the action of one of said admeasuring devices after a predetermined number of spaces have been registered.

15. In a composing machine the combination of the following elements, to wit; a series of admeasuring devices; a space registering mechanism; an actuating means for said space registering mechanism coupled with a plurality of said admeasuring devices representing different values; and means coupled with the space registering devices for automatically disconnecting one of said admeasuring devices from said actuating means.

16. In a composing machine such as described, the combination with the controlling member for the punch representing the designating factor of the space signal and a transmitter therefor, of an engaging shoulder coupled with said controlling member and adapted to be moved into and out of the path of the transmitter.

17. In a composing machine such as described and in combination with the controlling members for the punches representing the designating and positioning factors of the space signal and the transmitter or transmitters therefor, an engaging shoulder coupled with the controlling member for the designating factor and movable into and out of the path of the transmitter.

18. In a composing machine equipped with space registering devices, a line measuring mechanism including a series of admeasuring devices, a plurality of punches representing signal designating and dimensioning factors, and a plurality of controlling members, one for each punch, and in combination therewith operating means coupled with the controlling members of the punches representing the dimensioning and designating factors of the space signal, each of said punches being coupled with separate admeasuring devices, and means controlled by the space registering devices for disconnecting the punch representing the designating factor of the space signal from said operating means.

19. In a composing machine such as described, provided with a plurality of punch-bar motors, a universal bar provided with a motor opposed to those of the punch bars and exerting a degree of pressure upon the latter in excess of any single punch-bar motor, a line measuring mechanism including a series of admeasuring devices, and space registering devices, and in combination therewith a series of controlling members, one for each punch-bar motor, a series of transmitters coupled with said controlling members and means controlled by the space registering device for shifting the control of a transmitter from one to another of the controlling members.

20. In a composing machine provided with a plurality of controlling members each furnished with a movable engaging shoulder and a transmitter common to said controlling members, and in combination therewith, motor actuated devices coupled with said movable shoulders to advance the latter in alternation into the path of the transmitter.

21. In a composing machine the combination of the following elements, to wit; a plurality of controlling members each provided with a pivoted section carrying a shoulder; a transmitter adapted to contact with said shoulders, to move the controlling members; and means for alternately projecting said shoulders into the path of the transmitter.

22. In a composing machine the combination of the following elements, to wit; a plurality of controlling members each provided with a movable engaging shoulder; a transmitting member adapted to contact with said shoulders, and an actuating mechanism for said engaging shoulders, the same including a motor, a lever, and two engaging members coupled to the lever on opposite sides of the fulcrum thereof.

23. In a composing machine provided with a plurality of controlling members each equipped with a movable shoulder and a transmitting member adapted to engage said shoulders, and in combination therewith, two bars in parallel relation each coupled with one of said shoulders, to move them into and out of the path of the transmitter; a lever engaging said bars and pivotally supported intermediate thereof, a retracting spring and a motor.

24. In a composing machine, a mechanism for alternately projecting each of a pair of engaging shoulders into the path of a transmitter or actuating device comprising, in combination, the following elements, to wit; two longitudinally movable bars connected to opposite ends of a pivoted link; an actuating lever pivoted intermediate said bars and coupled therewith by slot and pin connections; and a spring connecting said link and lever on corresponding sides of their pivots but at relatively different distances therefrom.

25. In a composing machine a mechanism adapted to alternately project and retract each of two engaging shoulders, the same including, in combination, the following elements, to wit; two members connected to move in relatively opposite directions, an actuating lever loosely engaging said members; a retracting spring; and a motor loosely connected to said lever and operating in opposition to the retracting spring.

26. In a composing machine the combination of the following elements, to wit: a pair of movable controlling members each provided with an engaging shoulder movable transversely thereof; two shifting members or bars, one for each engaging shoulder, connected to move in relatively opposite directions, to advance one engaging member and retract the other; a spring coupled with said shifting members to hold them in one extreme position; and a motor coupled with said shifting members to reverse their positions.

27. In a composing machine provided with an intermittently advancing element such as the rack of the space register and a pair of controlling members each equipped with an engaging shoulder adapted to receive a transmitter, and in combination therewith, means for coupling said engaging shoulders with the transmitter in alternation; and motor devices controlled by said advancing element controlling said coupling means.

28. In a composing machine, the combination of the following elements to wit; a punch controlling member provided with a movable engaging shoulder and a transmitter; means for retracting said engaging shoulder including a motor; and controlling devices for said motor coupled with a space registering mechanism.

29. In a composing machine the combination of the following elements, to wit; a punch controlling member provided with a transmitter; means for detachably coupling said transmitter and controlling member provided with a motor, and controlling devices for said motor coupled with space registering devices.

30. In a composing machine the combination of the following elements, to wit; a punch controlling member and a transmitter therefor; means for detachably coupling said transmitter and controlling member provided with a motor; space registering devices, and a valve controlling said motor and in turn controlled by said space registering devices.

31. In a composing machine such as described and in combination with the motor and justification indicator racks thereof, a slide movable longitudinally and independently of the motor rack in the path of a gaging abutment thereon and provided with a bearing in the path of a shoulder on the justification indicator rack.

32. A composing machine such as described provided with a plurality of punches and operating levers therefor and in combination therewith a series of punch bars, one for each punch, interposed between the punches and levers, each of said punch bars provided with an offset on one side and a shoulder on the other side, the bars being divided into two series with their shouldered sides facing in opposite directions and a universal bar located in the interval between the two series of bars and engaging the shoulders thereof.

33. In a composing machine such as described, the combination of the following elements, to wit; a series of punch bars in parallel relation each formed with a straight punch receiving stem and a laterally off-set section containing a bearing the latter in alinement with the stem; a series of actuating levers extending transversely of the punch bars and each pivotally connected to one of said bars; and a universal bar located in the plane of the punch bar stems and engaging the bearings on said punch bars.

34. In a composing machine such as described the combination of the following elements, to wit; a plurality of punch-bars each recessed at one side and provided with a bearing in alinement with its punch; a universal bar movable in the path of said punch bar bearings; and a plurality of actuating levers, divided into two series the members whereof are pivoted on relatively opposite sides of the punch bars.

35. A perforating mechanism for composing machines such as described comprising, in combination, as alined series of punches; an alined series of punch bars each provided with a stem for the reception of its punch and a laterally extended section or off-set portion containing a bearing in the plane of its punch, a portion of said punch bars being arranged with their off-set sections in reverse position to that of the remainder; a universal bar located in the interval between the reversed members of the series of punch bars and engaging the bearings thereof and a plurality of levers, the alternate members whereof are pivotally supported on relatively opposite sides of the series of punch bars.

36. In a composing machine such as described provided with a main frame, a keybank mechanism supported on said main frame and a paper tower supporting the paper feed mechanism, and in combination therewith, a punching mechanism the operating elements whereof are all mounted and contained in the base of the paper tower above the main frame.

37. In a composing machine such as described provided with a keybank and line measuring and paper feeding mechanisms separately applied to a main frame, and in combination therewith, a punching mechanism including a series of punches, a series of punch bars, a series of actuating levers and a series of pistons and complemental cylinders, all mounted within the paper tower supporting the feeding mechanism.

38. In a composing machine such as described and in combination with the paper tower or frame supporting the paper feeding devices, a punching mechanism located within said paper tower and comprising a series of punches and actuating devices therefor.

39. In a composing machine such as described provided with line measuring mechanism, a keybank and paper feeding devices and in combination therewith a punching mechanism including a plurality of motor devices, punches and intermediate coupling devices located in the base of the frame supporting the paper feeding devices and above the level of the keybank, and a series of valves controlled by the keys of the keybank and coupled with the punch motors.

40. In a composing machine such as described the combination with the main frame supporting a keybank and a removable paper tower or frame supporting the paper feed mechanism and the series of punches, of an actuating mechanism for said punches including a series of punch bars, a series of actuating levers coupled therewith, a series of pistons, one for each punch bar, and a plate or block interposed between the main frame and paper tower, said plate or block bored to form cylinders for the reception of said pistons.

41. In a composing machine such as described provided with a series of punch actuating pistons and complemental cylinder and a series of control valves and in combination therewith a removable connected series of pipes or conduits held in fixed relation to one another in a rigid frame to which opposite ends of said pipes are connected, one end of the series registering with the cylinders and the other with the valves.

42. In a punch actuating mechanism for a composing machine such as described, the combination of the following elements, to wit; a series of punch actuating motors comprising complemental pistons and cylinders; a frame or bar provided with a series of valve chambers and valves; and a series of conduits or pipes connecting the valve chambers and cylinders, said series of pipes or conduits being connected in fixed relation to each other and detachably applied intermediate the valve bar or frame and the cylinders.

43. In a composing machine provided with a punching mechanism including a cylinder block or plate bored for the reception of a series of punch actuating pistons, and in combination therewith, a valve bar equipped with a series of control valves and a series of conduits or pipes for establishing communication between the valves and cylinders, said series of conduits or pipes being maintained in fixed relation to each other and in registry with the valves and cylinders by having corresponding ends secured to a plate detachably applied to the cylinder block or plate and forming the heads of the cylinders, the opposite ends of said series of conduits or pipes being secured to a bar attached to the valve bar and registering with the ports of the latter.

44. In a composing machine such as described, the combination of the following elements, to wit; a keybank and a series of valves controlled thereby mounted upon a main frame; a series of pipes maintained in fixed relation to each other by having opposite ends secured respectively to a bar registering with the valve ports and a plate, the latter detachably secured to the main frame; a cylinder block or plate detachably applied to the first mentioned plate with which the pipes are connected and provided with a series of openings registering with said pipes; and a series of punch actuating levers with connected pistons supported in a frame above said cylinder block or plate.

45. In a composing machine such as described provided with a series of punch bars, a series of actuating motors therefor and a universal bar engaging the punch bars and in combination therewith a motor coupled with the universal bar and acting in opposition to the punch bar motors, the pressure of said universal bar upon the punch bars being in excess of that of the individual punch bar motors but less than that of two such motors.

46. In a composing machine provided with a series of punches, a series of punch bars, a series of pistons and cylinders, one for each punch bar, a series of valves, one for each cylinder, and a pressure supply common to said valves and in combination therewith, a universal bar engaging the punch bars and a piston and cylinder coupled with said universal bar and acting in opposition to the punch pistons, said cylinder being in open communication with the pressure supply of the punch bar actuating cylinders.

47. In a composing machine provided with a series of punches, a series of punch bars, a series of pistons, one for each punch bar, and a series of valves one for each piston and in combination therewith, a universal bar engaging the punch bars, a piston coupled with said bar and a pressure supply common to all the pistons.

48. In a composing machine such as described, the combination with a series of punch bars and a universal bar adapted to engage all the punch bars, of a series of motors, one for each punch bar and a motor for the universal bar acting in opposition to the other motors and exerting a degree of pressure on the punch bars exceeding that of any one but less than the combined pressure of any two punch bar motors.

49. In a composing machine the combination with a spring retracted member such as the units rack of a zero stop or gage comprising a movable bar complemental gaging shoulders on said bar and the frame, and a spring of superior power to that of the retracted member and coupled with said movable bar to retain the gaging shoulders in contact.

50. In a composing machine such as described, the combination with the units rack and its actuating spring of zero stop for said units rack including a movable member interposed in the line of movement of the units rack and provided with a gaging shoulder and a retaining spring and a second spring seated member interposed in the line of movement of said first movable member.

51. In a composing machine provided with a keybank, a paper feed mechanism, a series of punches, and a line measuring mechanism controlled by a series of stop bars and in combination therewith punch actuating devices controlled by the keys and located in the base of the paper tower and a removable coupling unit interposed between said stop bars and the punch actuating devices.

52. In a composing machine provided with a measuring mechanism including a units wheel, holding pawl, units rack and units rack carrier and in combination therewith, a spring coupled with the holding pawl and an actuating lever pivoted to the holding pawl and units rack carrier.

53. In a composing machine and in combination with the escapement devices for the line measuring mechanism including a units wheel, a holding pawl, units rack and units rack carrier, of a spring coupled with the holding pawl and operating to advance the latter into engagement with the units wheel, an actuating lever pivoted to the holding pawl and units rack carrier, respectively, and means for locking the holding pawl in engagement with the units wheel during the initial advance of the units rack carrier toward the units wheel.

54. In a composing machine the combination with the escapement for the line measuring mechanism including the holding pawl, units rack and units rack carrier, of a lever pivotally connected at one end to the actuating device, at the opposite end to the holding pawl and at an intermediate point to the units rack carrier, and a spring coupled with the holding pawl.

55. In a composing machine provided with escapement devices for the line measuring mechanism including a holding pawl, a units rack and a units rack carrier and in combination therewith, a lever pivotally coupled with the units rack carrier and the holding pawl, and locking means, carried by the holding pawl and engaging the units rack carrier, operating to prevent the withdrawal of said locking pawl until the units rack carrier has advanced a sufficient distance to engage its units rack with the units wheel.

56. In a composing wheel and in combination with the line measuring mechanism thereof the following elements, to wit; an escapement device including an advancing member and two controlling members movable alternately into and out of engagement with the advancing member, one of said controlling members being adapted to move with the advancing member when in engagement therewith; means for admeasuring the advance of said controlling member while in engagement with the advancing member; means for actuating said controlling members; and a lock for preventing the withdrawal of one controlling member prior to the engagement of the companion controlling member.

57. In a composing machine the combination with the line measuring mechanism thereof provided with an escapement device including an advancing member and two controlling members movable alternately into engagement with the advancing member, one of said controlling members adapted to move with said advancing member, of means for admeasuring the advance of the controlling member movable with the advancing member, actuating devices for the controlling members, and a lock coupled with and actuated by said controlling members and operating to positively prevent the simultaneous withdrawal of both controlling members from the advancing member.

58. In a composing machine and in combination with the holding pawl and units rack of the escapement for the line measuring mechanism thereof, an actuating lever pivotally connected with the units rack carrier and the holding pawl, and an arm carried by the holding pawl in position to engage a shoulder on the units rack carrier and prevent the withdrawal of said holding pawl while the units rack is retracted but permitting such withdrawal when said rack is advanced a predetermined distance.

59. In a composing machine and in combination with the holding pawl and units rack for the line measuring mechanism, an actuating lever pivotally coupled with the units rack carrier and holding pawl; a locking member movable in a path intersecting that of the units rack carrier and a tripping coupling between the holding pawl and said locking member.

60. In a composing machine and in combination with the holding pawl and units rack of the line measuring mechanism thereof, a locking member movable in a path intersecting that of the units rack carrier and a tripping connection between the holding pawl and locking member.

61. In a composing machine and in combination with the holding pawl, units rack and units rack carrier, a locking member movable in a path intersecting that of the units rack carrier, a tripping connection between the holding pawl and locking member, and a spring coupled with said tripping connection and operating to both advance the holding pawl and maintain the tripping member in engagement with the locking member but permitting said tripping member to yield to release the locking member.

62. In a composing machine and in combination with the holding pawl, units rack, units rack carrier and admeasuring devices of the line measuring mechanism thereof, an actuating lever pivotally connected to the units rack carried and to the holding pawl at different points in its length, a locking member movable in a path intersecting the path of the units rack carrier, a tripping connection in the form of a lever mounted upon the holding pawl and provided with a pin engaging a shoulder or cam slot in the locking member, and a spring coupled with said tripping lever.

63. In a composing machine and in combination with the escapement devices for the line measuring mechanism including a holding pawl, units rack, units rack carrier and locking and tripping devices intermediate the holding pawl and carrier, and an actuator for the tripping device coupled with the holding pawl.

64. In a line measuring mechanism for a composing machine such as described, the combination of the following elements, to wit: an escapement mechanism provided with a holding pawl, units rack and units rack carrier; a locking device interposed between the units rack carrier and holding pawl for retaining the latter in engaging position during the advance and withdrawal of the units rack; a trip for said locking device; and an actuator for said trip.

65. In a line measuring mechanism for composing machines such as described the combination of the following elements, to wit: an escapement mechanism including a holding pawl, units rack and units rack carrier; a locking device movable in a path intersecting that of the units rack carrier, said locking device being coupled to move in unison with the holding pawl and provided with a trip for permitting independent movement of said locking device relatively to said holding pawl and an actuating lever for said trip coupled with the holding pawl in a manner to simultaneously throw the trip and retract the locking pawl.

66. In a line measuring mechanism for composing machines such as described, the combination of the following elements, to wit: an escapement including a holding pawl, a units rack and a units rack carrier; an actuating lever pivotally connected to the units rack carrier and holding pawl; a locking member; a trip or releasing connection between the holding pawl and locking member and a spring coupled to the holding pawl through the tripping member.

67. In a line measuring mechanism for composing machines such as described, the combination of the following elements, to wit: an escapement device including a holding pawl, a units rack and a units rack carrier; an actuating lever pivotally connected to said holding pawl and units rack carrier; a locking member for the holding pawl coupled to the latter through a trip or releasable connection; a spring coupled with said holding pawl through the trip; and a motor driven actuating device engaging the trip to disconnect or release the locking member and retract the holding pawl.

68. In a measuring mechanism for composing machines such as described, the combination of the following elements, to wit: an escapement mechanism including an advancing member and two alternately engaging members of which latter one is movable with the advancing member when in engagement therewith; actuating devices for said engaging members; and a detent for the advancing member coupled with the actuating devices of the engaging members.

69. In a measuring mechanism such as described, provided with an escapement device including an advancing member and two engaging members of which latter one is movable with the advancing member while coupled therewith; actuating devices for alternately coupling the engaging members with the advancing member; and a detent for the advancing member standing normally in the path of said advancing member and coupled with the actuating devices in a manner to effect the withdrawal of said detent when the engaging member capable of movement with the advancing member is coupled therewith.

70. In a measuring mechanism for composing machines, the combination of the following elements, to wit; an escapement mechanism including a units wheel; holding pawl, units rack and units rack carrier; a detent movable transversely of the path of the units wheel; and an actuating lever coupled with the holding pawl, units rack carrier and detent.

71. In a measuring mechanism for composing machines provided with escapement devices including units wheel, holding pawl, units rack and units rack carrier, and in combination therewith a spring actuated detent lying in the path of the units wheel; and an actuating lever coupled with the units rack carrier and detent, to withdraw the latter upon engagement of the units rack with the units wheel.

72. In a measuring mechanism for composing machines the combination of the following elements, to wit: an escapement mechanism including an advancing member and two alternately engaging members of which latter one is movable with the advancing member while in engagement therewith; a detent for the advancing member; and means for retracting the engaging members and detent to release the advancing member and permit its return to zero position.

73. In a measuring mechanism for composing machines, the combination of the following elements, to wit; an escapement mechanism including an advancing member and two engaging members; and a detent for the advancing member coupled with the actuating devices of the engaging members in a manner to effect its withdrawal from the path of the advancing member whenever both engaging members are likewise withdrawn.

74. In a measuring mechanism for composing machines provided with an advancing member and two alternately engaging members and in combination therewith a detent normally projecting into the path of the advancing member and actuating and releasing devices for said engaging member coupled with the detent to retract the latter.

75. In a measuring mechanism for composing machines the combination of the following elements, to wit; an escapement mechanism including units wheel, holding pawl, units rack and units rack carrier; a detent normally in the path of the units wheel; and an actuating lever for the units rack carrier coupled with said detent to retract the latter.

76. In a measuring mechanism for composing machines, the combination of the following elements, to wit; an escapement device including units wheel; holding pawl; units rack and units rack carrier; a detent for the units wheel; and a lever coupled with the holding pawl to retract the latter; said lever being also coupled with the detent to retract the latter.

77. In a measuring mechanism for composing machines, the combination of the following elements, to wit; an escapement provided with a units wheel, holding pawl, units rack and units rack carrier; an actuating lever coupled with the units rack carrier and holding pawl; a releasing lever for the holding pawl; a detent for the units wheel; and coupling means intermediate said releasing and actuating levers and the detent for retracting the latter.

78. In a composing machine provided with measuring and indicating devices the one controlled by an escapement device including a retaining pawl and the other by actuating and holding pawls and in combination therewith mechanism for retracting said pawls including a furcated bar engaging the actuating and holding pawls, a movable member in position to engage the retaining pawl and a motor coupled with said furcated bar and movable member.

79. In a composing machine, a space registering mechanism including the following elements, in combination, to wit; a ratchet bar guided in a supporting frame; a bracket on said frame; a holding pawl supported on said bracket; an actuating pawl in parallel relation to the holding pawl carried on the arm of a shaft mounted in said bracket; and a motor coupled with said shaft.

80. In a composing machine provided with a measuring mechanism and in combination therewith a signal mechanism comprising a bell; a striker; a lever carrying said striker and provided with a spring tending to advance the striker toward the bell; and a latch engaging said lever and extending into the path of a movable portion of the measuring mechanism.

81. In a composing machine provided with a measuring mechanism and in combination therewith the following elements, to wit; a signal bell; a lever provided with a striker and spring, the latter operating to advance the striker toward the bell; a shouldered latch for engaging said lever, to maintain the latter in retracted position and a motor coupled with said lever and operating to retract the striker and reëngage the latch.

82. In a composing machine provided with a measuring mechanism and in combination therewith the following elements, to wit; a bell; a striker carried by a lever; a shouldered latch for engaging said lever provided with a spring and standing in the path of a pin or shoulder connected to move in unison with the measuring devices; and a motor coupled with said lever and operating to cause the reëngagement of the latch and lever.

83. In a paper feed mechanism for composing machines and in combination with the ratchet wheel, feeding and retaining pawls, actuating lever, and take-up shaft thereof, a ratchet wheel for the take-up shaft, a pawl, a spring operating to advance the pawl, and transmitting devices intermediate the actuating lever and take-up pawl operating to retract the latter.

84. In a paper feed mechanism for composing machines provided with a take-up shaft and ratchet wheel, a feeding ratchet wheel, actuating and holding pawls for the latter and an actuating lever for said feeding pawl and in combination therewith the following elements, to wit; a winding pawl for the take-up ratchet wheel provided with an advancing spring; a holding pawl; connections between the actuating lever and said winding pawl for retracting the latter; and a spring interposed between the take-up shaft and its ratchet wheel.

85. In a paper feed mechanism for composing machines and in combination with the strip feeding and winding devices thereof a spring interposed between the take-up ratchet wheel and winding shaft, a pawl engaging the take-up ratchet, a spring for advancing said pawl to rotate the shaft, and means coupled with the strip feeding devices for retracting said pawl.

86. In a paper feed mechanism for composing machines, the combination of the following elements, to wit; a winding shaft and take-up ratchet wheel with intermediate transmitting spring; holding and driving pawls for said ratchet wheel; a motor for said driving pawl operating to advance the winding shaft; and a transmitting member loosely coupled with the actuating pawl and actuating lever of the strip feeding devices.

87. In a paper feed mechanism for composing machines provided with intermittently acting feeding devices deriving motion from a reciprocatory actuating lever and in combination therewith the following elements, to wit; a winding mechanism including a shaft, ratchet wheel and intermediate transmitting spring; holding and actuating pawls for said ratchet wheel; a motor for said actuating pawl; and transmitting connections between said actuating pawl and actuating lever operating in opposition to restore the latter at each feed movement.

88. In a paper feed mechanism for composing machines including a ratchet wheel, a holding pawl and a driving pawl, the latter coupled with an actuating lever and in combination therewith a plate pivotally supported upon the axis of the ratchet wheel and provided with shoulders in position to engage and retract the holding and driving pawls.

89. In a paper feed mechanism for composing machines including a ratchet wheel, a holding pawl and a driving pawl the latter coupled with an actuating lever and in combination therewith a pivoted plate provided with shoulders in position to engage and retract the holding and driving pawls, said plate being coupled to the actuating lever through a projection movable between abutments and a spring tending to retain said projection in contact with one of said abutments.

90. In a feed mechanism for composing machines provided with feeding devices including a ratchet wheel, holding pawl and driving pawl, the latter coupled with an actuating lever and winding devices including a ratchet wheel, holding and driving pawls therefor and a motor spring, and in combination therewith a tripping and driving mechanism, including a pivoted plate provided with tripping means for the pawls of the feeding mechanism, said plate being coupled with the actuating lever through a projection movable between shoulders and a spring; a link connected to said plate and coupled with the driving pawl of the winding devices through a pin and slot connection, said link carrying a pin in position to engage the holding pawl of the winding devices; and a lifting shield supported in position to engage the driving pawl of the winding devices when said pawl is retracted to an abnormal degree.

91. In a feed mechanism for composing machines, provided with feeding and winding devices, each including a ratchet wheel and driving and holding pawls, the driving pawl of the winding devices being coupled with a motor spring and that of the feeding devices with an actuating lever, and in combination therewith the following elements, to wit; a pivoted plate coupled with the actuating lever through the medium of a projection working between opposite shoulders and a spring for maintaining engagement of said projection with one of said shoulders; arms in said pivoted plate in position to engage and retract the driving and holding pawls of the feeding devices; a link pivoted to said plate and coupled with the driving pawl of the winding devices, said link carrying a shoulder in position to engage the holding pawl of the winding devices; and a retractor for the driving pawl of the winding devices located in position to be engaged by said pawl and provided with a shoulder to receive and retain said pawl.

92. In a composing machine such as described provided with a series of punches, a paper feed mechanism and a plurality of actuating motors and—in combination therewith an integral block or plate bored to form the cylinders for said motors.

93. In a composing machine such as described provided with a series of punches and a paper feed mechanism, and in combination therewith, a series of motors, one for each punch, an actuating motor for the feeding devices, and a plate or block containing the cylinders for the individual motors.

94. In a composing machine such as described the combination with the paper feed mechanism mounted upon the paper feed tower or frame, and the series of punches located within said frame, of a plurality of motors, one for each punch, and the paper feeding devices, whose cylinders are contained in a plate or block upon which the paper tower or frame is mounted.

95. In a composing machine provided with a perforating mechanism, including a series of punch bars and a universal bar, and a paper feed mechanism, and in combination therewith a plate or block containing cylinders for the punch bar and feed mechanism motors, the latter including two opposing cylinders and pistons; a pivoted lever coupled with said opposing pistons and with the feeding devices; a valve controlling the pressure in said opposed cylinders, said valve being located in a chamber in the cylinder block or plate, and actuating devices for said valve coupled with the said universal bar.

JOHN SELLERS BANCROFT.
MAURITZ C. INDAHL.

Witnesses:
MORTIMER A. JONES,
W. ARTHUR SELLMAN.